(12) United States Patent
Massarenti et al.

(10) Patent No.: US 10,354,215 B2
(45) Date of Patent: Jul. 16, 2019

(54) SYSTEM AND METHOD FOR SERVICE MODELING

(71) Applicant: ServiceNow, Inc., Santa Clara, CA (US)

(72) Inventors: Davide Massarenti, Bothell, WA (US); Chinna Babu Polinati, Snoqualmie, WA (US); Sridhar Chandrashekar, Sammamish, WA (US)

(73) Assignee: SERVICENOW, INC., Santa Clara, CA (US)

( * ) Notice: Subject to any disclaimer, the term of this patent is extended or adjusted under 35 U.S.C. 154(b) by 342 days.

(21) Appl. No.: 15/334,701

(22) Filed: Oct. 26, 2016

(65) Prior Publication Data

US 2018/0114153 A1    Apr. 26, 2018

(51) Int. Cl.
    *G06Q 10/00*     (2012.01)
    *G06Q 10/06*     (2012.01)

(52) U.S. Cl.
    CPC .................................. *G06Q 10/067* (2013.01)

(58) Field of Classification Search
    CPC .... G06Q 10/101; G06Q 10/06; G06Q 10/067; G06F 8/35; G06F 16/289; G06F 17/248
    See application file for complete search history.

(56) References Cited

U.S. PATENT DOCUMENTS

| | | | |
|---|---|---|---|
| 8,862,631 B2 | 10/2014 | Trinon et al. | |
| 2006/0242207 A1* | 10/2006 | Tsyganskiy | ............... G06F 8/72 |
| 2007/0226038 A1* | 9/2007 | Das | ........................... G06F 8/10 |
| | | | 705/348 |
| 2008/0312982 A1 | 12/2008 | Braun et al. | |
| 2009/0171705 A1* | 7/2009 | Bobak | .................... G06Q 10/06 |
| | | | 705/80 |

(Continued)

FOREIGN PATENT DOCUMENTS

EP    1607860 A2    12/2005

OTHER PUBLICATIONS

Kiyoi, Gregory; "Connect With Remedy—CMDB Best Practices—Get Set, Get Ready, Go! Webinar—Q&A", BMC Communities, https://communities.bmc.com/docs/DOC-35189, Feb. 25, 2015, downloaded Oct. 17, 2016, 15 pp.

(Continued)

*Primary Examiner* — Augustine K. Obisesan
(74) *Attorney, Agent, or Firm* — Fletcher Yoder PC

(57) ABSTRACT

A method can include storing information about the business service in one or more template type layers; storing information about an instance of the business service in one or more instance type layers; wherein the template type layers include one or more checkpoints that reference information stored in a content addressable store that defines an expected structure of the business service, wherein at least one checkpoint of the template type layers includes a timestamp and a hash value associated with an entry in the content addressable store; and wherein the instance type layers include one or more checkpoints that reference information stored in the content addressable store that defines attributes of the instance of the business service, wherein at least one checkpoint of the instance type layers includes a timestamp and a hash value associated with an entry in the content addressable store.

20 Claims, 11 Drawing Sheets

(56) References Cited

U.S. PATENT DOCUMENTS

| | | | |
|---|---|---|---|
| 2010/0057780 A1* | 3/2010 | Isobe | G06F 8/71 |
| | | | 707/E17.045 |
| 2010/0161577 A1 | 6/2010 | Morozov | |
| 2010/0306638 A1* | 12/2010 | Oleksy | G06F 8/315 |
| | | | 715/221 |
| 2011/0153558 A1 | 6/2011 | Tubman et al. | |
| 2011/0321033 A1 | 12/2011 | Kelkar et al. | |
| 2014/0019611 A1* | 1/2014 | Weavind | H04L 41/0853 |
| | | | 709/224 |
| 2016/0291821 A1* | 10/2016 | Feiges | G06F 9/4881 |
| 2016/0364212 A1* | 12/2016 | Mohaban | G06Q 10/10 |

OTHER PUBLICATIONS

Kalyani, Prachi, Understanding Drift Management, BMC Atrium Core 8.1—BMC Documentation, https://docs.bmc.com/docs/display/public/ac81/Understanding+Draft+Management?preview=/461635629/462389893/Draft_Arch1.jpg, Jun. 4, 2014, 2 pp.

Johnson, Brian et al.; "IT Service Modeling for the CA CMDB", White Paper: Service Modeling and CMDB Design, CA Technologies, Jan. 2014, 32 pp.

Tweed, Duncan et al.; "Data Model", BMC Discovery 8.3—BMC Documentation—Support Central, Jan. 5, 2011, https://docs.bmc.com/docs/display/DISC083/Data+Model, downloaded Oct. 17, 2016, 2 pp.

* cited by examiner

SYSTEM AND METHOD FOR SERVICE MODELING

TECHNICAL FIELD

The present disclosure relates in general to systems and methods for service modeling.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Most individuals and organizations, such as businesses and governmental agencies, utilize computers on a daily basis to perform a variety of functions. These functions may include, for example, email, internet access, word processing, computer-aided design, media streaming, and many others. Indeed, individuals and organizations not only utilize their own computers to perform these functions, but since many of the functions are "cloud-based" most individuals and organizations utilize servers in data centers around the globe to perform many of these functions.

As organizations grow, the number of users and, thus, computers and associated devices, such as file servers, email servers, routers, etc., increase as well. These computers and associated devices can be used to provide computerized services to users, such as e-mail services, accounting services, web-based services, expense system services, and the like. Hence, many organizations utilize information technology operations management ("ITOM") tools to manage such systems. The ITOM tools may include policies, processes, and procedures to design and maintain the computers and associated functionalities for an organization. For example, ITOM tools may keep track of user computers and associated services, software, servers, routers, etc., within an organization so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology infrastructure grows, designing and maintaining such systems can be a difficult task.

BRIEF DESCRIPTION OF THE DRAWINGS

The description herein makes reference to the accompanying drawings wherein like reference numerals refer to like parts throughout the several views.

DETAILED DESCRIPTION

Figure 1:
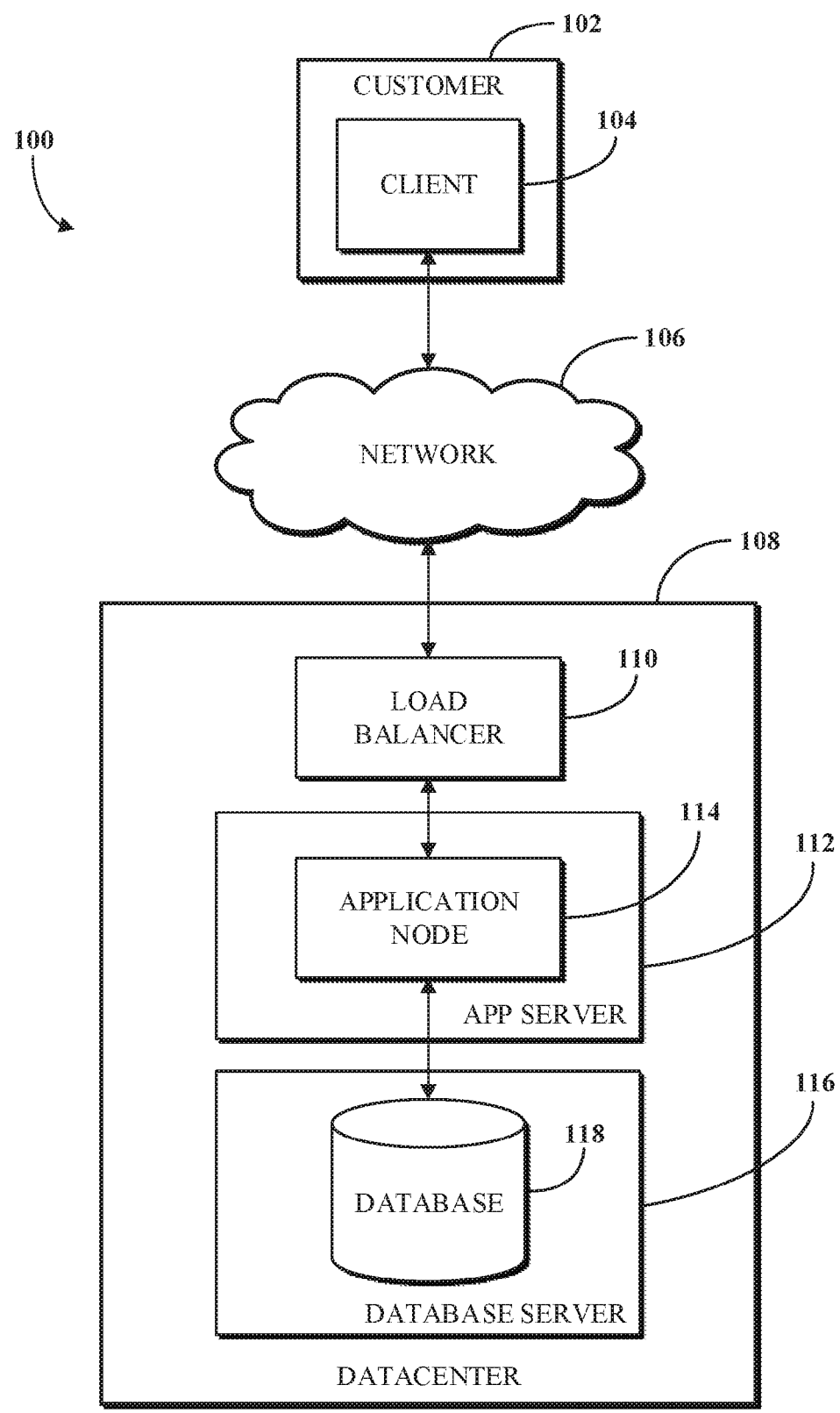
FIG. 1 is a block diagram of an example of an electronic computing and communications system.

Many organizations utilize information technology operations management ("ITOM") tools to manage the provisioning of computerized systems. These ITOM tools may include policies, processes, and procedures to design and maintain the computers and associated functionalities for an organization. For example, ITOM tools may keep track of user computers and associated services, software, servers, routers, etc., within an organization so that administrators can determine when users have been added or removed, when equipment has been added, removed, or needs to be upgraded, when software needs to be updated, etc.

When dealing with individuals or small organizations, such tasks can be relatively straight forward and easy to perform. However, as organizations and their associated information technology infrastructure grows, designing and maintaining such systems can be a difficult task. It thus may be desirable to store information about the devices, software, and other components of a computer network in a configuration management database ("CMDB"). It thus may also be desirable to store information about the services provided by the computer network, such as in a service model. For example, a service model can include the components and relationships between components used to provide a computerized service. A service model can provide a representation of a business service and can be used for managing a computing system associated with the business service. Such service models can be used for various activities throughout the lifecycle of a business service. For example, service models could be used to define, provision, configure, deploy, map, discover, manage, remediate, remove, or retire services or their constituent components. It is desirable to have a single service model structure that can support all or most aspects of a lifecycle of a business service, such as most or all of the service model lifecycle activities described above.

In an example, a business service could be modeled based on the components that support the business service. Such components may be represented as configuration items ("CIs") that may be stored in or otherwise associated with the CMDB. In such a context, the CMDB can include a plurality of CIs, attributes associated with the CIs, relationships between the CIs, or a combination thereof. A CI can comprise a record that represents a component associated with the computing system. For example, a CI can represent a hardware or software component, a software license, a hardware or software contact, or other components associated with the computing system. In some implementations, a business service can be represented in the CMDB by one or more CIs. A business service can encompass services, such as e-mail or the like that are provided and supported by components associated with the computing system. For example, a business service can include delivering email to a user, providing business applications, such as accounting software, to a user, or other suitable computerized services delivered to a user. The business service can be supported by computing devices, servers, clients, software, software licenses, software or hardware contracts, other suitable components, or a combination thereof.

In the context of modeling a business service, CIs in the CMDB deemed to be associated with the service model could be modified to include an attribute indicating their respective association with the business service, for example. However, such an implementation of a service model can have limitations on its use. For example, it may be difficult to manage historical data, represent different layers of a service, or manage against a desired state of a service.

It may be disadvantageous to store service model information in the CMDB. For example, information in the CMDB may represent a current state of the computer network and it may be difficult, storage intensive, or computing intensive to store and access past information about a service in the CMDB. It may also be difficult to store information about a service that does not directly map to information stored in the CMDB, such as template or structure information about the service.

An improved approach to modeling a business service, as discussed herein, can include a service model stored separately from the CMDB with links to the CMDB. In such an implementation, the service model can more flexibly include information such as historical data about a particular service, templates for particular types of services (e.g., desired states), the ability to store the service model in a compact data repository, or combinations thereof.

For example, in an implementation, a service model can include multiple layers of information relating to a service. A layer can include a category, segment, or other defined portion of information relating to a business service. Information relating to the category, segment, or other defined portion can be stored and associated with the layer. Content stored on different layers can represent different classes or types of information. For example, a service model can include different types of layers. For example, the service model can include one or more layers that are template type layers and one or more layers that are instance type layers. A template type layer can include information that represents the structure or desired configuration of the business service and an instance type layer can include information about a given instance of the business service, such as at a respective point in time.

In an implementation, the layers of a service model can include an entry point layer and a template layer, which are template type layers, and a matching layer, a matching infrastructure layer, and an impact layer, which are instance type layers (e.g., representative of the implementation of the service described in the template layers). Other layer configurations can be used. It may be advantageous, depending on the implementation, to include additional layers or less layers in the service model.

Information in the entry point layer can represent information about how the modeled business service is accessed (e.g., via Hypertext Transport Protocol (HTTP), Secured HTTP (HTTPS), using Application Programming Interfaces (APIs) (e.g., Simple Object Access Protocol (SOAP)), Representational State Transfer (REST), or other suitable mechanisms for accessing modeled business service). Information in the template layer can represent information about the desired configuration of the business service (e.g., that the business service includes an Apache web server, a MySQL database, or JavaScript interpreter application software). The information in the entry point and template layers can indicate types of components and can omit information about particular instances or installations of components and associated devices. For example, in an implementation, the template layer is associated with CI types (e.g., a CI classification that can include information stored for a particular type of hardware or software), and not CIs. The information stored in the entry point and template layers may, in an implementation, be stored in one layer Information in the matching and matching infrastructure layers can represent information about an instance of a business service and can link information in the entry point or template layers to CIs in a CMDB. For example, the matching layer can include information relating to instances of software, such as an Apache web server installation, a MySQL database installation, and a JavaScript interpreter installation. For example, the matching infrastructure layer can include information relating to the hardware on which software is installed and accessed, such as network devices (e.g., a load balancer) through which the software is accessed over a computer network and computing devices (e.g., server devices) on which the application software instances are installed and executed. Information in the impact layer can include status information (e.g., events or alerts) about components represented in the other layers (for example, software in the matching layer and hardware in the matching infrastructure layer), impact rules (e.g., on how to interpret the alerts or events to generate an impact score, or status). The information in the impact layer can be used to, for example, generate information about the status of the business service modeled by the service model.

The layers of the service model are associated with information of the business service using checkpoints. Each layer can have a number of checkpoints associated with the layer. A checkpoint is used to store information about the state of the business service at a particular time. For example, a template layer can include two checkpoints indicating the state of the structure of a business service at two points in time. In such an example, the two checkpoints could refer to the same information if the structure of the business service is the same at the two points in time. Alternatively, the two checkpoints could refer to different information if the structure of the business service has changed between the two points in time.

A checkpoint can include attribute information (e.g., the time of the checkpoint) and a reference to data about the business service relating to the layer that it is associated with. The data can be represented as an object and the reference to data stored in the checkpoint can be, for example, a hash value of the data. An object can, for example, take the form of a data structure or a value. An object can include, for example, a binary large object ("blob"), serialized data in character form, character large objects, other representations of collections of data, or combinations thereof. For example, an object can take the form of data structures as further described with respect to FIG. 4.

Objects can be stored in a data store such as a content addressable store (CAS). As further described herein, different types of objects can be used to represent the information associated with a business service. For example, there can be multiple checkpoints in each layer. The checkpoints can be associated with particular points of time and the multiple checkpoints can form a timeline that represents the state of the layer over time. The checkpoints can include connections between layers. In an implementation, the layers of a service model can be hierarchical in nature. For example, in such a hierarchical context, a change in a "higher" layer (e.g., a new checkpoint in the template layer) can cause connected checkpoints in one or more "lower" layers to be marked to be updated in response to the change.

In an example, a business service can include a web based service provided using a load balancer, a web server, and a database. The business service can be accessed through an entry point associated with the load balancer. Information, such as a CI type, associated with the load balancer, web server, and database server can be stored on template type layers. For example, entry point information associated with entry points associated with the load balancer, web server, and database server can be stored on an entry point layer. Entry point information stored on the entry point layer can include the format of the entry point, such as an HTTP connection to port 80, a SSH connection to port 22, or the like.

In an alternative implementation, only the entry point information associated with the entry point to the business service (e.g., associated with the load balancer) is stored on the entry point layer. In such an implementation, entry point information associated with the web server and the database server can, for example, be omitted or stored on a template layer.

Information associated with the load balancer, web server, and database server, such as a CI type associated with the load balancer, web server, and database server, and relationships between the load balancer, web server, and database server can be stored on a template layer. The information associated with the load balancer, web server, and database server stored on the template type layers can define a structure of the components that support the business service instead of instances of the components that support the business service.

Instances of the components that support the business service can be stored on instance type layers and can relate back to information stored in the template type layers. With respect to the foregoing example, an F5 load balancer instance can relate back to the load balancer, two Apache web server instances can relate back to the web server, and a MySQL database server can relate back to the database server. The F5 load balancer instance can, for example, distribute network or application traffic between the two Apache web server instances. The Apache web server instances can, for example, communicate with the MySQL database server instance to, for example, retrieve information about records stored in tables associated with the MySQL database server instance. The F5 load balancer instance, the Apache we server instances, and the MySQL database server instance can be represented by CIs in the CMDB. Further, entry point instances associated with the F5 load balancer instance, the Apache web server instances, and the MySQL database server instance can be represented by CIs in the CMDB which can be referred to by information stored in a matching layer associated with the entry point instances. Entry point instances can, for example include a host name usable for accessing the component instance according to the entry point defined in, for example, an entry point layer. For example, information stored in the entry point layer can indicate that the entry point uses HTTP and port 80 and the entry point instance may refer back to the information in the entry point layer and also include information about a host name or IP address. Together, the information in the entry point layer and the matching layer can indicate that the entry point instance uses HTTP, port 80, and the host name or IP address. Information associated with the Apache web server instances and the MySQL database server instance, such as a reference to CIs that represent the Apache web server instances and MySQL database server instance, can be stored on a matching layer. Further, information associated with entry point instances associated with the Apache web server instances and MySQL database server instance, such as references to actual CIs representing the entry points, can be stored on the matching layer.

Information associated with F5 load balancer instance, such as a reference to a CI that represents the F5 load balancer instance, can be stored on a matching infrastructure layer. Further, information associated with entry point instance associated with the F5 load balancer, such as a reference to a CI representing the entry point instance, can be stored on the matching infrastructure layer. The information associated with the F5 load balancer instance, the Apache web server instances, and the MySQL database server instance stored on the instance type layers define a specific instance or installation of the business service.

By structuring the service model in this way, advantages can be realized, such as the ability to track drift between a desired state of a service, such as represented in the template type layers, and an actual state of a service, such as represented in the instance type layers. As a further example, historical states of a service can be more easily found using the layer timelines and referencing checkpoints at a particular time of interest. As a further example, compression of historical data can be more easily achieved by selectively merging related checkpoints, selectively merging older checkpoints, selectively removing older checkpoints, or combinations thereof. As a further example, storage space for storing information of the service model (i.e., objects, such as blobs in one example) can be reduced through the use of the CAS, where multiple checkpoints having the same data or subsets thereof can reference the same object or a subset of objects in the CAS instead of storing new copies of redundant data for various checkpoints. Other advantages exist, including those described in more detail later.

In an implementation, a business service can be modeled in order to identify components associated with the business service, to track or monitor changes made to components associated with the business service, for other suitable reasons for modeling a business service, or a combination thereof. Modeling a business service can include performing a search of the CMDB to identify CIs associated with the business service and relationships between the CIs and generating a template that represents the identified CIs and relationships between the identified CIs. Additionally, or alternatively, maintaining or updating a model of a business service can include performing a search of the CMDB to identify CIs associated with the business service and replacing or modifying some or all the CIs or the relationships between the CIs represented in the template of the business service such that the template represents the CIs identified during the subsequent search of the CMDB. Additionally, or alternatively, maintaining or updating a model of a business service can include creating a template of a desired business service before it is deployed or implemented (e.g., before there are CIs of an actual deployment or implementation of the business service). Service models can also be created responsive to discovery operations performed to discovery a business service, user input, or combinations thereof.

To describe some implementations in greater detail, reference is first made to examples of hardware structures. FIG. 1 is a block diagram of an example of an electronic computing and communications system 100 in accordance with this disclosure. As used herein, the term "electronic computing and communications system," or variations thereof, can be, or include, a distributed computing system (e.g., a client-server computing system), a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or a combination of physical units. In some implementations, a single physical unit can include multiple clients.

In some implementations, the client 104 can be an instance of an application running on a customer device associated with the customer 102. As used herein, the term "application" can include, but is not limited to, applications, programs, instances, processes, threads, services, plugins, patches, application version upgrades, or any other identifiable computing unit. The system 100 can include any number of customers or clients or can have a configuration of customers or clients different from that generally illustrated in FIG. 1. For example, and without limitation, the system 100 can include hundreds or thousands of customers and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, or path. In some implementations, a client 104 associated with the customer 102 can connect to, or communicate via, the network 106 using a distinct connection point, link, or path. A connection point, link, or path can be wired, wireless, use other communications technologies, or a combination thereof.

In some implementations, the network 106 can include, for example, the Internet. In some implementations, the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communication traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticking sessions, between a client and a service or application provided by the datacenter 108.

A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, any number of application servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as the database 118 of the database server 116.

In some implementations, the application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. In some implementations, the database server 116 includes a data storage unit, such as a database 118, which can be accessible by an application executed on the application node 114. In some implementations, the database 118 can be implemented as a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, the database 118 can be configured as or comprise any suitable database type. Further, the system 100 can include one, two, three, or any suitable number of databases configured as or comprising any suitable database type or combination thereof.

In some implementations, the database 118 can be configured as or comprise a CMDB. A CMDB can be comprised of a plurality of configuration items (CIs), attributes associated with the CIs, or relationships between CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

In some implementations, one or more databases (e.g., the database 118), tables, other suitable information sources, or portions or combinations thereof can be stored, managed, or otherwise provided by one or more of the elements of the system 100 other than the database server 116, such as the client 104 or the application server 112.

Some or all of the systems and methods described herein can operate or be executed on or by the servers associated with the system 100. For example, an update for an application executed on the application node 114 can include updating or upgrading the database 118. In some implementations, the systems and methods described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (e.g., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database or the secondary database can be implemented as a relational database management system (RDBMS), an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a service or application to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocating resources in a multi-tenant architecture can include installations or instantiations of one or more servers, such as application servers, database servers, or any other server, or combination of servers, that can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. In some implementations, customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

In some implementations, a customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
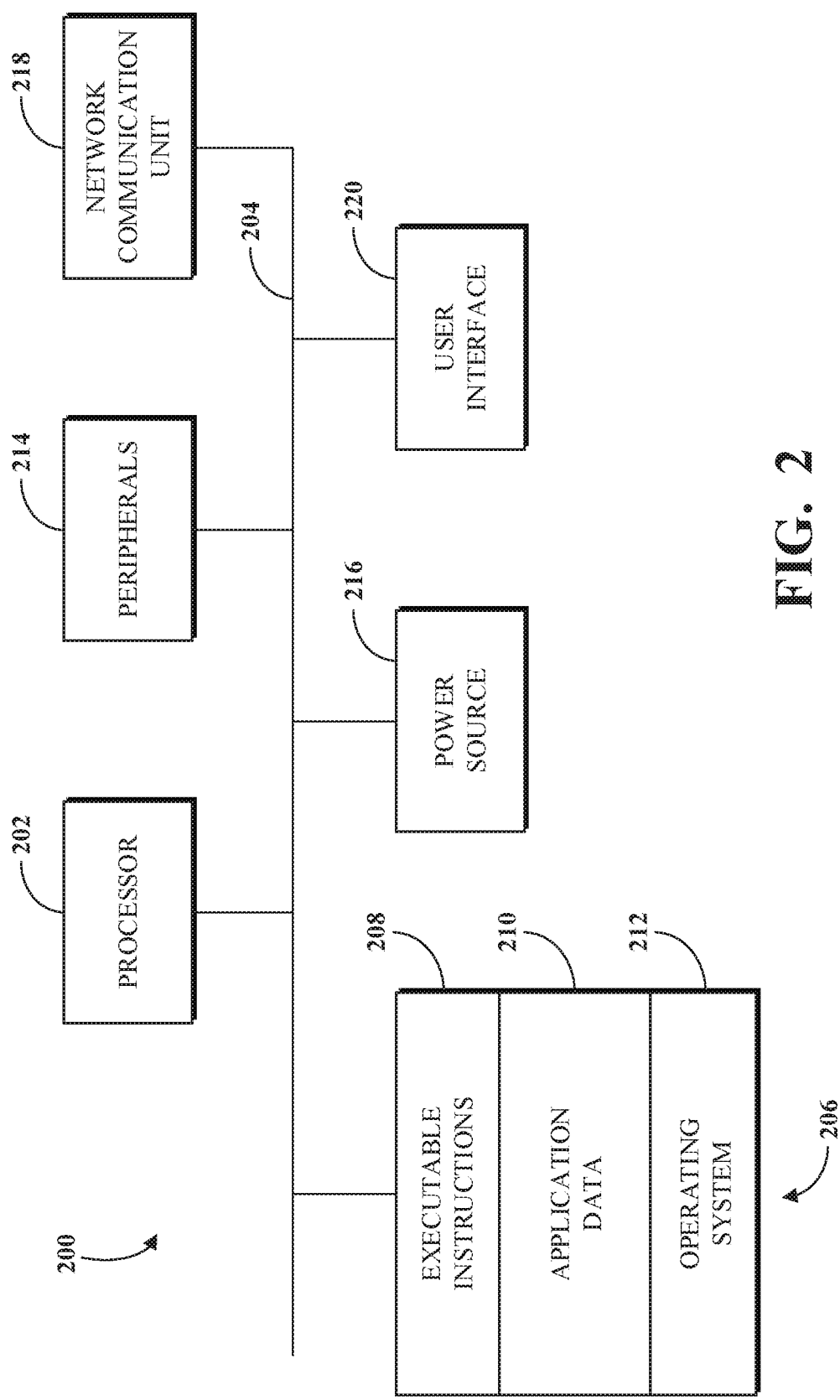
FIG. 2 is a block diagram of an example internal configuration of a computing device of the electronic computing and communication system shown in FIG. 1.

FIG. 2 generally illustrates a block diagram of an example internal configuration of a computing device 200, such as a client 104 or a server, such as an application server 112 or a database server 116, of the system 100 as generally illustrated in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now-existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

In some implementations, the memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. In some implementations, the memory 206 can include another type of device, or multiple devices, now-existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a computing device 200 can include volatile memory, such as RAM, and persistent memory, such as a hard drive or other storage. Although depicted here as a single bus, the bus 204 can be composed of multiple buses, which can be connected to one another through various bridges, controllers, or adapters.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to generate a model of a business service based on CIs associated with the business service. The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®, or an operating system for a small device, such as a smartphone or tablet device; or an operating system for a large device, such as a mainframe computer. The memory 206 can comprise one or more devices and can utilize one or more types of storage, such as solid state or magnetic storage. The memory 206 can be distributed across multiple clients or servers, such as network-based memory or memory in multiple clients or servers performing the operations of clients or servers.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214. The operations of the processor 202 can be distributed across multiple clients or servers, which can be coupled directly or across a local area or other suitable type of network.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
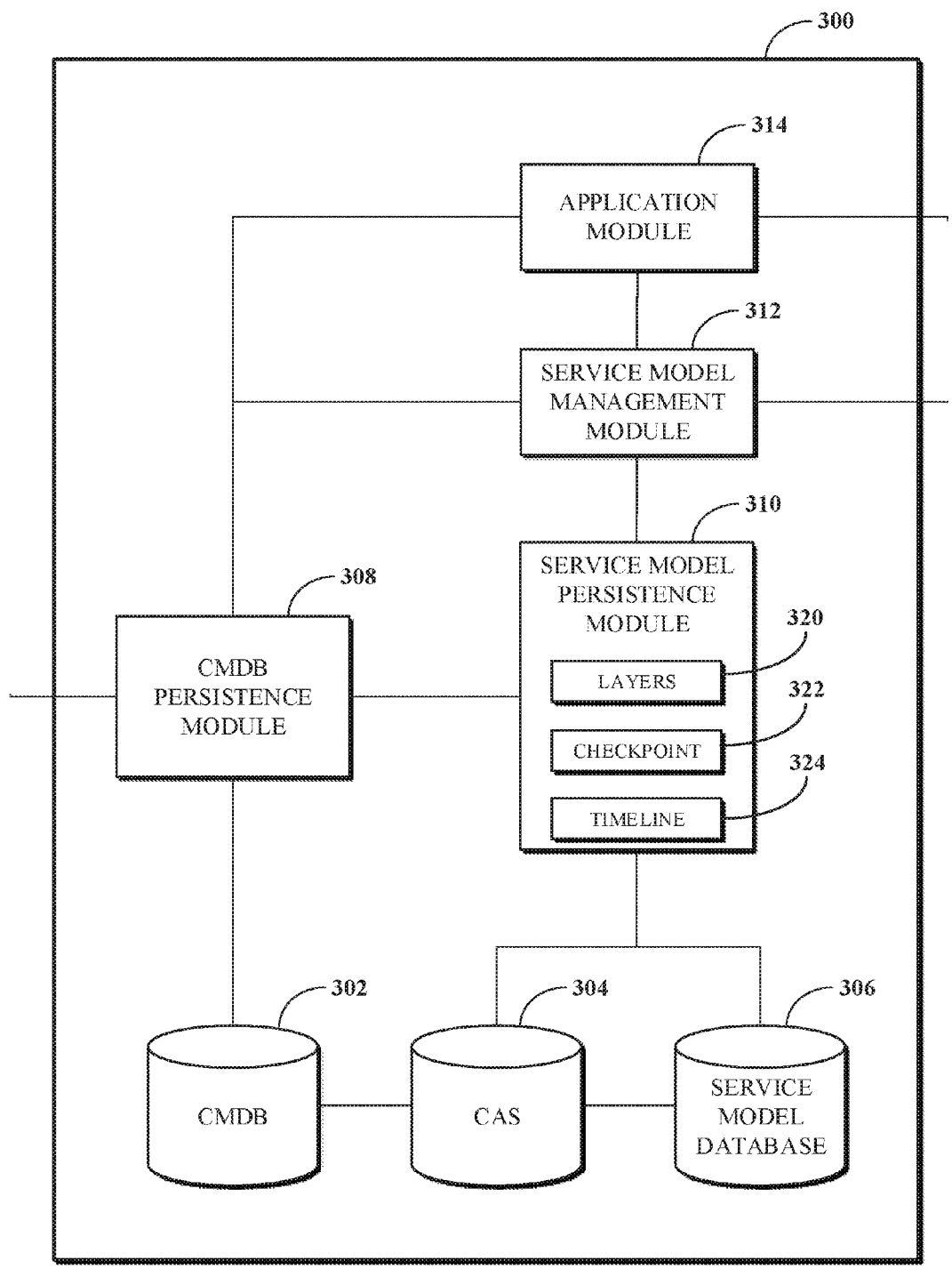
FIG. 3 is a block diagram of an example of a service modeling system.

FIG. 3 is a block diagram of an example of a service modeling system 300. The system 300 can include a CMDB 302, CAS 304, service model database 306, CMDB persistence module 308, service model persistence module 310, service model management module 312, application module 314, or combinations thereof. In some implementations, the system 300 can be configured to generate, update, or store a service model of a business service.

The elements of service modeling system 300 can, for example, be implemented in system 100, such as in datacenter 108 and using application node 114 and database 118. Service modeling system 300 can, for example, be a part of a platform as a service (PaaS) or software as a service (SaaS) offering by a provider that operates datacenter 108 and provides the service modeling system 300 to various customers such as customer 102. For example, in an implementation, customer 102 can have a number of business services and components that can be modeled and represented using service modeling system 300. For example, in an implementation, information about components of customer 102 can be discovered, software or configurations thereof can be deployed to customer 102, alerts or events about components or business services can be received from customer 102, or combinations thereof. In an implementation, agent software can be installed within customer 102 to facilitate communications between customer 102 and datacenter 108 or application node 114 to permit discovery, deployment, communication of alerts or events, or combinations thereof.

The CMDB 302 can include CIs that represent components present or expected in a respective business model and which can include servers, clients, software, licenses, other suitable components, or a combination thereof. A CI can include a record that includes information about the component. For example, the CI record can reference a CI type that represents a component type associated with the component, a CI name that represents a name associated with the component, other suitable information associated with the component, or a combination thereof. In some implementations, a CI can include or reference information about a relationship between two or more CIs.

Figure 4:
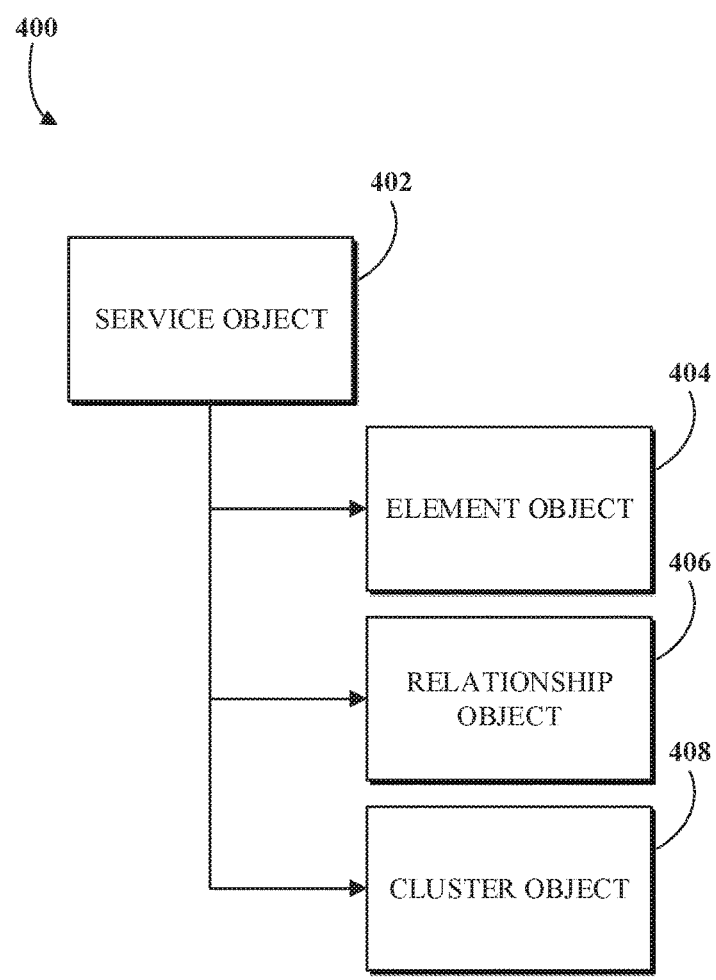
FIG. 4 is a block diagram of an example data structure usable in a content addressable store in an implementation of a service modeling system.

The CAS 304 can be a content addressable store that stores data about components of the service model in the form of objects. The objects can, for example be structured as shown in FIG. 4 and described later. The objects can, for example, reference CIs in the CMDB 302 and can be referenced by service model data stored in service model database 306.

A content addressable store can store objects in such a way that they are accessible based on their content instead of a particular location associated with content. For example, when an object is to be stored in a CAS, a hash can be generated for the object, which can be a fixed-size value associated with that object (e.g., generated using MD5, SHA-1, or the like). Such a hash can be generated in such a way to reduce the likelihood of collisions between hash values (e.g., where the same hash value is generated for different objects) such that objects corresponding to different data or content have correspondingly different, unique hash values, allowing the hash values to be useful as a searchable or comparison index. Thus, a particular object can be found using its associated hash value. A CAS can be beneficial for use in the disclosed service model storage system because like objects associated with multiple checkpoints (further described later) can be stored once in the CAS and referenced by the hash associated with that object for the various checkpoints. The use of a CAS can be advantageous over a typical storage mechanism (e.g., where the same object would be stored multiple times) by reducing storage space and increasing response time when interacting with the service model.

For example, if an object is already stored in the CAS (e.g., if the hash value associated with the object already exists in the CAS), no further action need be taken, and the object will not be stored twice. For example, if an object is not already stored in the CAS (e.g., if the hash value associated with the object does not already exist in the CAS), the object will be stored in the CAS. For example, a parent object (e.g., service object as described later with respect to FIG. 4) may have one reference to an object (e.g., an element object as described later with respect to FIG. 4) not stored in the CAS and a number of references to other objects already stored in the CAS (e.g., by the hash values of the respective objects). In such a case, the parent object will not already exist in the CAS (e.g., it will have a hash not stored in the CAS) because it references an object not yet stored in the CAS. In such a case, the parent object and the one new object referenced by the parent object will be stored in the CAS. No further action need be taken with respect to the other objects referred to by the parent object already stored in the CAS.

The service model database 306 can store service model data such as information about the layers, checkpoints, and timelines of a service model. The service model data can include references to data stored in CAS 304. For example, a checkpoint can include attribute data, a time stamp, and a hash value reference to an object stored in CAS 304. A checkpoint can also, for example, include references to other checkpoints, a timeline to which it is a part, a layer to which the checkpoint is a part, or combinations thereof.

CMDB 302, CAS 304, and service model database 306 can be stored in database 118, other database(s), or combinations thereof. CMDB 302, CAS 304, or service model database 306 can be implemented using a relational database, an object-oriented database, a non-relational database, a key-value database, graph-based database, other suitable database, or combinations thereof.

The CMDB persistence module 308 can provide an application programming interface (API) to permit access to the CMDB by modules of service modeling system 300, other modules of application node 114, external applications, or combinations thereof. For example, CMDB persistence module 308 can provide a set of functions to permit reading, creating, or modifying CIs in the CMDB 302.

The service model persistence module 310 can provide an API to permit access to the CAS 304 and service model database 306 by modules of service modeling system 300, other modules of application node 114, external applications, or combinations thereof. Service model persistence module 310 can include logic for maintaining the data structure, state, and consistency of service models stored in CAS 304 and service model database 306, including the creation and maintenance of layers, checkpoints, and timelines. Such activities can for example, be undertaken by layers module 320, checkpoint module 322, and timeline module 324.

The layers module 320 can, for example, provide APIs to permit the creation, modification, and deletion of layers within a service model. For example, layers module 320 can also be configured to maintain a hierarchy, or other structure, arrangement, or inter-relationship, of layers that can be used by other modules. A layer can be representative, for example, of a particular class or type of information relating to a business service.

Checkpoint module 322 can be configured to provide APIs for the creation of checkpoints and the linking together of checkpoints. For example, checkpoint module 322 can be configured to permit the creation of a checkpoint associated with an object stored in CAS 304 and having specified attributes. A checkpoint can indicate, for example, the state of components associated with a layer (e.g., the state of the portion of the business service represented by that layer) at a particular time as represented by the attribute information of the checkpoint and the object associated with the checkpoint.

Timeline module 324 can be configured to maintain and provide access to series of checkpoints within a layer over time. In an implementation, timeline module 324 can be configured to allow multiple timelines per layer and to permit the merging or deletion of timelines. Service model persistence module 310 can also be configured to permit the creation of new objects in CAS 304, such as during the creation of a checkpoint using checkpoint module 322. In an implementation, each layer can have a master timeline that is authoritative for the business service. When the state of the service model is queried, the master timeline is the one that is referenced.

Other timelines can be added to represent information related to the business service, such as information relating to a pending deployment, information relating to a proposed change to the service, information relating to backup instance of the service, or other information relating to the service that may, for example, not actually be implemented. Timeline module 324 can delete a timeline, e.g., when instructed by service model management module 312, such as when a timeline is no longer valid or needed (e.g., in the case of a failed deployment, a canceled change, or the like). Timeline module 324 can merge a timeline, e.g., when instructed by service model management module 312, such as when the timeline is actually implemented (e.g., deployment occurs, change happens, template is updated, or the like). In such a case, a new checkpoint can be created in the master timeline reflecting the combination of the latest checkpoints in the timeline to be merged and the master timeline.

The service model management module 312 can provide higher level management functions relating to a service model. For example, the service model management module 312 can combine similar checkpoints, merge historical checkpoints to reduce data utilization, create new timelines in one or more layers, initiate the merging of timelines in one or more layers, initiate garbage collection (removal of unused objects from CAS 304), perform updates of layers marked as needing updates, generate service models from CMDB data, update service models from CMDB data, provide an interface to application modules that use service models, or combinations thereof.

In some implementations, the service model management module 312 can generate a service model based on a business service associated with an entry point instance. The service model management module 312 can receive information from the application module 314 associated with the business service to be modeled. The information can include the entry point instance, CIs identified as being associated with the entry point instance ("identified CIs"), abstracted data associated with the identified CIs, CIs that facilitate communications between the identified CIs, or combinations thereof. The entry point instance can include information on how to access the business service, as described above. The application module 314 can perform a discovery process based on the entry point instance, as described below. The service model management module 312 can be configured to use the service model persistence module 310 to store the service model using checkpoints, layers, timelines, or combinations thereof in accordance with information received from the application module 314.

In some implementations, the service model management module 312 can communicate the information received from the application module 314 to the service model persistence module 310. The service model persistence module 310 can communicate the entry point instance and the abstracted data associated with the identified CIs to the layers module 320. The layers module 320 can be configured to generate one or more layers based on the entry point instance and the abstracted data. For example, the layers module 320 can generate an entry point layer, a template layer, a matching layer, a matching infrastructure layer, and an impact layer. The layers can be associated with a service model representing the business service associated with the entry point. The layers module 320 can store the layers in the service model database 306.

In some implementations, the service model persistence module 310 can create objects of information to be stored in the CAS 304 related to information received from, for example, the service model management module 312. The objects can, for example, be structured as illustrated in FIG. 4. Objects can be created for information stored on different layers. As used below, the terms entry point object, template object, matching object, matching infrastructure object, and impact object can refer to an element object including information for a particular layer. These objects can be structured as illustrated in the example of FIG. 4, or using other suitable structure, either individually or collectively.

Creating an object can include the service model persistence module 310 checking the CAS 304 to determine whether an object exists that includes information similar to a potential new object. For example, the service model persistence module 310 can compare a hash value associated with a potential new object with hash values associated with objects stored in the CAS 304. When the service model persistence module 310 identifies a hash value associated with an object stored in the CAS 304, the service model persistence module 310 can use that object to represent the information associated with the potential new object, as described in detail below. Alternatively, when the service model persistence module 310 determines that none of the hash values associated with objects stored in the CAS 304 are identical to the hash value associated with the potential new object, the service model persistence module 310 creates the new object according to the data structure illustrated in FIG. 4 and stores the new object in the CAS 304.

In some implementations, the service model persistence module 310 can create an entry point object that represents the entry point. The entry point object can include information about the entry point. The entry point object can include information about a how to access the entry point. For example, the entry point object can indicate that the entry point is accessed via Hypertext Transport Protocol (HTTP), Secured HTTP (HTTPS), using Application Programming Interfaces (APIs) (e.g., Simple Object Access Protocol (SOAP)), Representational State Transfer (REST), or other suitable mechanism for accessing the entry point. The service model persistence module 310 can store the entry point object in the CAS 304. The checkpoint module 322 can generate an entry point checkpoint associated with the entry point object. The entry point checkpoint can include a timestamp corresponding to a time that the service model persistence module 310 generated the entry point object. The entry point checkpoint can also include a reference to the entry point object. The reference can include a hash value associated with the entry point object. The checkpoint module 322 can be configured to store the entry point checkpoint associated with the entry point object on the entry point layer.

The service model persistence module 310 can create one or more template objects based on the abstracted data. The abstracted data can include a CI type associated with an identified CI. A CI type can indicate that an identified CI is a particular type of CI. For example, a CI type can indicate that an identified CI is of a webserver type, a web application type, a client type, a client application type, a load balancer type, a database type, or other suitable CI types. A template object can include a template representative of an identified CI. The template can include a CI type corresponding to an identified CI, a reference to an entry point object associated with the entry point layer, other suitable CI information, or a combination thereof. For example, the service model persistence module 310 can create a template object that includes a CI type representative of an identified CI. A template object can be related to an entry point object. For example, a first entry point object can include information about an entry point and a first template object can include information about a CI type associated with a CI identified as being associated with the entry point. The first template object can include a reference to the first entry point object.

The service model persistence module 310 can store the template objects in the CAS 304. The checkpoint module 322 can generate a template checkpoint associated with a template object. The template checkpoint can include a timestamp (e.g., the timestamp associated with the checkpoint associated with the entry point object) and a reference to a template object corresponding to the template checkpoint. The checkpoint module 322 can store the template checkpoint on the template layer.

The service model persistence module 310 can create one or more matching objects based on the abstracted data. The abstracted data can include a reference to an actual CI stored in a CMDB 302. A reference to a CI can indicate the name of a component associated with the identified CI and a location of the identified CI in the CMDB 302. In some implementations, the abstracted data can include a reference to a cluster of CIs. A cluster of CIs can include two or more components having similar attributes.

Figure 8:
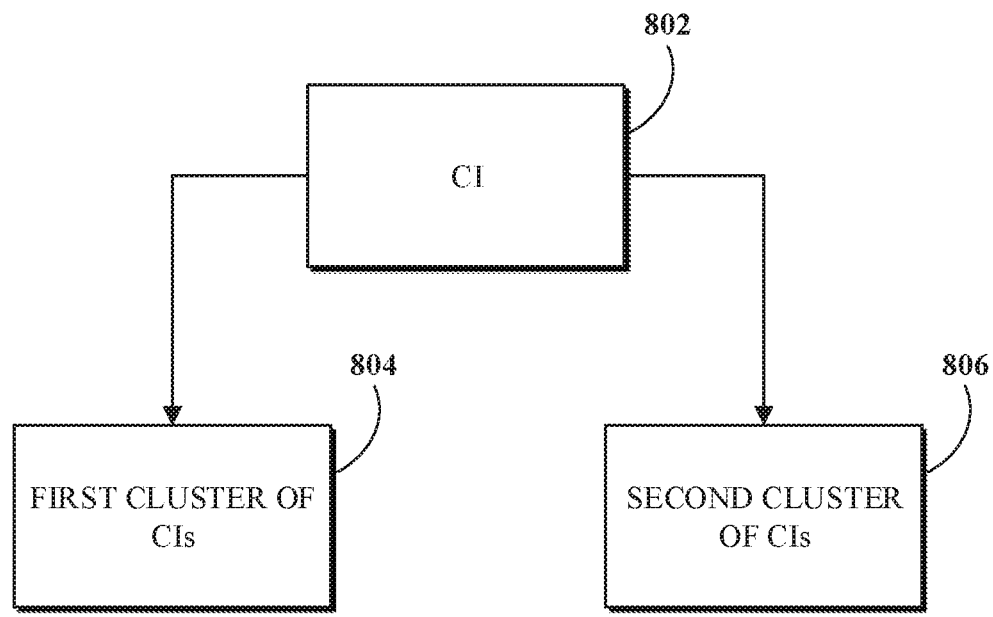
FIG. 8 is an illustration of example relationships between configuration items representative of a cluster in a configuration management database.

As illustrated in FIG. 8, a CI 802 can have a relationship with a first cluster of CIs 804 and a relationship with a second cluster of CIs 806. In some implementations, the relationship between the CI 802 and the first cluster of CIs 804 can be the same as the relationship between the CI 802 and the second cluster of CIs 806. Alternatively, the relationship between the CI 802 and the first cluster of CIs 804 can be different from the relationship between the CI 802 and the second cluster of CIs 806. In some implementations, components associated with the first cluster of CIs 804 can be similar to or different from components associated with the second cluster of CIs 806. It should be understood that a CI can have a relationship with one, two, three, or other suitable numbers of clusters. In an example, a cluster (e.g., the first cluster of CIs 804) can include multiple web servers, multiple application services, or other suitable components. Components associated with a CI cluster can be represented by multiple CIs in the CMDB 302 (e.g., a CI for every one iteration of the component). In a service model, a cluster of CIs can be referenced as a cluster object. A cluster object can include a reference to a type of CI that is representative of the multiple CIs associated with the cluster of CIs (e.g., a webserver CI), and a reference to an object on a layer above the layer the cluster object is stored on (e.g., a reference to a template object when the cluster object is stored on the matching layer).

The service model persistence module 310 can generate a matching object that includes a CI name of an identified CI, a reference to an actual CI stored in the CMDB 302, a reference to a template object stored in the CAS 304, other suitable information, or a combination thereof. In an example that includes a cluster of CIs, the matching object can include a reference to a CI type that represents the cluster of CIs and a reference to the CIs in the CMDB 302 that are associated with the cluster of CIs. In another example, a matching object can include information associated with an entry point instance. The matching object can, for example, include a hostname or IP address associated with the entry point instance. The matching object can include a reference to an entry point object that includes information about the template of the entry point instance. For example, a matching object that includes a hostname associated with an entry point instance can include a reference to an entry point object that indicates the entry point uses HTTP to access the entry point instance.

The service model persistence module 310 can store matching objects in the CAS 304. The checkpoint module 322 can generate a matching checkpoint associated with a matching object. The matching checkpoint can include a timestamp (e.g., the timestamp associated with the checkpoint associated with the entry point object), a reference to a matching object, or a reference to an entry point checkpoint or a template checkpoint (e.g., an entry point checkpoint that references an entry point object associated with the matching object). The checkpoint module 322 can store the matching checkpoint on the matching layer.

In some implementations, the service model persistence module 310 can generate one or more matching infrastructure objects based on the identified CIs. The service model persistence module 310 can generate a matching infrastructure object based on the CIs that facilitate communications between the identified CIs. The matching infrastructure object can include a name of a component that facilitates communication between identified CIs, a reference to an actual CI stored in the CMDB 302 that represents the component, a reference to a matching object stored in the CAS 304, other suitable information, or a combination thereof. For example, a first matching infrastructure object can include a reference to the first matching object. It should be understood that while only a first matching infrastructure object including a reference to a first matching object is described, the system 300 can be configured to generate a plurality of matching infrastructure objects that include a reference to the same or different matching objects.

The service model persistence module 310 can store the generated matching infrastructure objects in the CAS 304. The checkpoint module 322 can generate a matching infrastructure checkpoint associated with a matching infrastructure object. The matching infrastructure checkpoint can include a timestamp (e.g., the timestamp associated with the checkpoint associated with the entry point object) and a reference to a matching infrastructure object. The checkpoint module 322 can store the matching infrastructure checkpoint on the matching infrastructure layer.

In some implementations, the service model persistence module 310 can create one or more impact objects based on alert records stored in an alert table. An alert record can include information that defines how a CI can be impacted as a result of an event occurring in the computing system 100. For example, an alert record can indicate that a component associated with an identified CI will be unable to communicate with another component in the event that a network component is offline. For example, an alert record can indicate that a component associated with an identified sensor is overheating, which can be based on a reading of a temperature sensor connected to the component.

The service model management module 312 can be configured to retrieve alert records associated with the identified CIs from the alert table. The service model management module 312 can communicate the retrieved records to the service model persistence module 310. The service model persistence module 310 can generate impact objects based on alerts associated with the identified CIs. An impact object can include an alert definition associated with an identified CI, a reference to a matching infrastructure object, other suitable information, or combinations thereof. In some implementations, one or more alerts can be associated with an identified CI. Accordingly, the service model persistence module 310 can generate one or more impact objects that include a reference to the same identified CI and, accordingly, include a reference to the same matching infrastructure object. For example, a first impact object can include a reference to a first matching infrastructure object and a second impact object can include a reference to the first matching infrastructure object.

The service model persistence module 310 can store the impact objects in the CAS 304. The checkpoint module 322 can be configured to generate an impact checkpoint associated with an impact object. The impact checkpoint can include a timestamp (e.g., the timestamp associated with the checkpoint associated with the entry point object) and a reference to an impact object corresponding to the checkpoint. The checkpoint module 322 can store the impact checkpoint on the impact layer.

In some implementations, the service model management module 312 can update or maintain one or more layers associated with a service model. For example, the service model management module 312 can determine whether to update or maintain one or more layers in response to a change to a CI associated with the business service associated with the service model. In some implementations, the service model management module 312 can receive a notification that a CI associated with the business service has changed. For example, a user associated with the system 100 can generate the notification, an automatic notification generation system can be configured to monitor CIs associated with the business service and generate a notification in response to a change to a CI associated with the business service, other suitable mechanisms for generating notifications indicating a CI has changed, or combinations thereof. The service model management module 312 can instruct the CMDB persistence module 308 to retrieve the changed CI from the CMDB 302. The changed CI can be stored in the CMDB 302 as a result of a discovery process performed by the application module 314, as described below. The CMDB persistence module 308 can communicate information associated with the identified CI to the service model management module 312. The service model management module 312 can communicate a CI, or CIs, received from the CMDB persistence module 308 and abstracted data associated with the CI, or CIs, to the service model persistence module 310. The service model management module 312 can instruct the service model persistence module 310 to update or maintain a service model accordingly. In some implementations, a CI associated with the business service can be removed from the CMDB 302. If a CI associated with a business service is removed from the CMDB 302, the service model management module 312 can communicate that the CI has been removed from the CMDB 302 to the service model persistence module 310 and can instruct the service model persistence module 310 to update or maintain the service model accordingly.

In some implementations, the service model management module 312 can be configured to update or maintain one or more layers associated with a service model in response to a layer becoming stale. For example, the service model management module 312 can be configured to monitor a most recent checkpoint associated with a layer. When the most recent checkpoint includes a timestamp that is older than a defined age (e.g., one week, one month, or other suitable age), the service model management module 312 can instruct the CMDB persistence module 308 to retrieve CIs associated with an entry point associated with a modeled business service from the CMDB 302. CIs associated with the entry point can have changed since the layer was previously updated. Changes made to CIs can be reflected in the CMDB 302 as a result of a discovery process performed by the application module 314, as described below. The service model management module 312 can communicate the updated identified CIs and abstracted data associated with the updated identified CIs to the service model persistence module 310. The service model management module 312 can use the service model persistence module 310 to update or maintain the stale layer based on the identified CIs, such as described below.

The service model management module 312 can determine which of the entry point layer, template layer, matching layer, matching infrastructure layer, or impact layer is affected by changes made to a CI based on abstracted data associated with the updated identified CIs. In some implementations, the service model management module 312 can use the service model persistence module 310 to update a particular affected layer, when the layer has become stale. In an example, the service model management module 312 can determine that the matching layer can be affected by a change to a web server associated with the business service.

As described above, the service model persistence module 310 can create one or more objects based on the abstracted data. The service model persistence module 310 can create a new object associated with the affected layer. For example, the service model persistence module 310 can create a new matching object when the matching layer is affected by the change to a CI associated with the business service. The service model persistence module 310 can compare the new object to objects stored in the CAS 304. The service model persistence module 310 can compare a hash value associated with the new object to hash values stored in the CAS 304 associated with the affected layer. When the service model persistence module 310 identifies an object having a hash value that is identical to the hash value associated with new object, the checkpoint module 322 generates a new checkpoint that includes a timestamp corresponding to a point in time at which the checkpoint was created and a reference to the object stored in the CAS 304 and stores the checkpoint on the affected layer.

When the service model persistence module 310 does not identify an object in the CAS 304 that has a hash value identical to the hash value associated with the new object, the service model persistence module 310 stores the new object in the CAS 304. The checkpoint module 322 generates a checkpoint that includes a timestamp corresponding to a point in time at which the checkpoint was created and a reference to the new object and stores the checkpoint on the affected layer.

The service model persistence module 310 can invalidate the layer below the affected layer (e.g., the matching infrastructure layer is the layer below the matching layer). The service model persistence module 310 can then create a new object associated with the invalidated layer based on information received from the service model management module 312 or the application module 314. The service model persistence module 310 compares a hash value associated with the new object associated with the invalidated layer with hash values associated with objects stored in the CAS 304 associated with the invalidated layer. The service model persistence module 310 and the checkpoint module 322 continue as described above based on whether a hash value associated with the new object associated with the invalidated layer matches a hash value associated with an object stored in the CAS 304 associated with the invalidated layer. The service model persistence module 310 can continue generating new objects corresponding to a layer until a hash value associated with new object is identical to a hash value associated with an object stored in the CAS 304. The service model persistence module 310 can save updated layers to the service model database 306.

In some implementations, the service model management module 312 can generate a service model based on an entry point, identified CIs, abstracted data associated with the identified CIs, CIs that facilitate communications between the identified CIs, a previously generated entry point layer, a previously generated template layer, or combinations thereof. For example, the service model management module 312 can receive an entry point instance, identified CIs, abstracted data associated with the identified CIs, CIs that facilitate communications between the identified CIs, or combinations thereof. The service model management module 312 can be configured to compare information associated with the entry point instance to entry point objects stored in the CAS 304. When the service model management module 312 identifies an entry point object that includes information similar to the information associated with the received entry point instance, the service model management module 312 can access an entry point layer associated with the identified entry point object. The service model management module 312 can then determine whether a template layer associated with the entry point layer includes template objects that include information similar to information associate with the identified CIs. When the service model management module 312 determines the template layer includes template objects that include information similar to information associated with the identified CIs, the service model management module 312 can access the template layer. The service model management module 312 can use the entry point layer and the template layer as the entry point layer and the template layer for a new service model. The service model management module 312 can use the service model persistence module 310 to generate a matching layer, a matching infrastructure layer, and an impact layer based on the entry point layer, the template layer, the identified CIs, the abstracted data associated with the identified CIs, or the CIs that facilitate communication between the identified CIs.

In some implementations, the service model management module 312 can manage unofficial timelines associated with one or more layers. For example, a user associated with the computing system 100 can create a copy of a timeline associated with a layer associated with a service model. A copy of a timeline can be referred to as an unofficial timeline. The user can create objects and checkpoints on the unofficial timeline, for example, in a development environment, although it should be understood that unofficial timelines can be created for other suitable reasons. When the user desires to publish the unofficial timeline (e.g., make the unofficial timeline the official timeline), the service model management module 312 can communicate the unofficial timeline to the timeline module 324. The timeline module 324 can retrieve a copy of the official timeline and compare the unofficial timeline to the official timeline. The timeline module 324 can update the official timeline to include changes made on the unofficial timeline. The timeline module 324 can save the official timeline to the service model database 306.

In some implementations, the service model management module 312 can be configured to initiate a garbage collection process. For example, objects stored in the CAS 304 can be represented by other objects or checkpoints stored on layers in a service model. Overtime, an object can become unreferenced (e.g., no objects or checkpoints make reference to the object). For example, a user can create a test environment to test a business service before deploying the business service. Objects associated with the test environment can become unreferenced by other objects or checkpoints, such as when an unofficial timeline with checkpoints related to the test environment are deleted. In another example, checkpoints can be deleted to compress a timeline, resulting in in unreferenced objects that were associated with only the deleted checkpoints.

The service model management module 312 can identify objects that are no longer referenced by other objects or checkpoints. The service model management module 312 can communicate hash values associated with unreferenced objects to the garbage collection process. The garbage collection process can remove the objects from the CAS 304.

The application module 314 can consume service models for providing application level services or can collect or process information to generate service models, such as by using the service model management module 312 or the service model persistence module 310. For example, application module 314 can be a discovery module, an event management module, a service mapping module, a deployment module, a user interface module, or combinations thereof. In some implementations, the system 300 can include more than one application module 314.

In some implementations, the application module 314 can be a service model display module. For example, the application module 314 can be configured to communicate information, such as a service model, to a user interface. The user interface can be on a display monitor or other suitable user display. The application module 314 can receive a request from a user, via the user interface, to display a service model. The application module 314 can retrieve the service model from the service model database 306 using the service model management module 312 or the service model persistence module 310. The application module 314 can generate a graphical representation of the service model. The graphical representation can include a graphical depiction of CIs associated with the service model. In some implementations, the graphical representation can include color codes, objects (e.g., pins), other suitable graphical information, or combinations thereof. For example, a graphical representation of a service model can include a timeline of events associated with the business service. An event can be represented by a pin. A pin can be a graphical object that can include information about CIs, checkpoints, objects, or other suitable information. In some implementations, a user can click on a pin to view the information. A pin can also include information associated with changes made to CIs associated with a service model. In some implementations, a user can determine what has changed by clicking on a pin. In other implementations, a user can associate the timing of a system outage with changes made to a CI associated with the service model my viewing information associate with a pin displayed on the timeline near the time of the outage. A user can then determine whether the change to the CI prompted or contributed to the outage. In some implementations, the graphical representation can be generated using interpretable markup language, scripts, images, or combinations thereof, which when interpreted, processed, or executed on a client device, can be rendered for display on a display, such as a display associated with the user interface 220 of FIG. 2.

In some implementations, the application module 314 can receive a request to display a most recent version of a service model. The application module 314 can identify a most recent checkpoint associated with an impact layer or other layers associated with the service model. The most recent checkpoint can correspond to a checkpoint having a timestamp that is the latest in time. A most recent checkpoint associated with the impact layer or other layers can be referred to as a snapshot. In some implementations, checkpoints on one layer can reference checkpoints on other layers. A snapshot can be created by identifying a first checkpoint on a first layer and identifying a position on a second layer based on a second checkpoint referenced by the first checkpoint, and so on. A snapshot can include information about a business service associated the service model at the time the snapshot was generated. For example, a snapshot can include information associated with objects referenced by checkpoints stored on the layers. The information associated with the objects can include information about configuration of CIs associated with the objects at the time the checkpoints were created. The application module 314 can generate a graphical representation of the service model based on the most recent checkpoint.

In some implementations, a user can select a desired point in time to view a version of the business service as it existed at the desired point in time. The application module 314 can be configured to identify a checkpoint associated with the impact layer or other layers that includes a timestamp that is closest in time to the desired point in time. The application module 314 can generate a graphical display of the service model as it existed at the desired point in time. For example, the application module 314 can identify element objects associated with checkpoints associated with the checkpoint on the impact layer or other layers that is closest in time to the desired time.

In some implementations, the application module 314 can instruct the service model persistence module 310 to make changes to a service model based on user input. For example, a user can identify CIs associated with a service model that are not associated with the business service (e.g., the system 300 can include CIs that appear to be associated with the business service that are not needed). In some implementations, the user can utilize a graphical user interface to view the service model. The graphical user interface can be configured to receive user input. For example, the user can click, select, or otherwise identify CIs that should not be included in the service model. The graphical user interface can be configured to communicate the user input to the application module 314. The application module 314 can communicate the user input to the service model management module 312. The service model management module 312 can use the service model persistence module 310 to update one or more of layers associated with the service model based on the user input. For example, the service model persistence module 310 can remove a selected object from the service model based on the user input. The service model persistence module 310 can update the layers accordingly.

In some implementations, a user can modify how a business service is modeled by the system 300. For example, a user can utilize the graphical user interface described above to access a service model. The user can select portions of the service model that the user does not want included in future service models. For example, the user can determine not to include information about network infrastructure components in future generated service models. The user can select objects associated with a service model that represent network infrastructure components associated with the business service. The application module 314 can receive the user selections and communicate the user selections to the service model management module 312. The service model management module 312 can modify the service model data structure to reflect the user selections.

In some implementations, the application module 314 can be configured to identify instances of a business service associated with the computing system 100 based on a service model. For example, the application module 314 can receive a request from a user to identify instances of a business service associated with the computing system 100. The application module 314 can use a service module associated with the business service to identify other instances of the business service associated with the computing system 100. The application module 314 can perform a discovery process to identify CIs having a similar configuration to the CIs associated with the service model. When the application module 314 identifies CIs having a similar configuration to the CIs associated with the service model, the application module 314 can store information associated with the identified instance of the business service.

In some implementations, the application module 314 can utilize a service model to deploy an instance of a business service. For example, the application module 314 can receive a request to deploy an instance of a business service onto the computing system 100. The application module 314 can be configured to identify an entry point layer and a template layer associated with a service model associated with the business service. The application module 314 can be configured to provision components associated with the business service on the computing system 100 based on information associated with objects associated with the entry point layer and the template layer. The application module 314 can then gather information about the provisioned components, for example, by performing a discovery process, by receiving manual user input, by performing a data abstraction on CIs associated with the deployed business service, other suitable mechanisms for gather information about the provisioned components, or combinations thereof. The information about the provisioned components can include CIs associated with the deployed business service, abstracted data associated with the CIs, CIs that facilitate communications between the CIs associated with the deployed business service, or combinations thereof. The application module 314 can communicate the information to the service model management module 312. The service model management module 312 can use the service model persistence module 310 to generate or update a service model. For example, the service model persistence module 310 can generate new objects, new layers, new checkpoints, new timelines, or combinations thereof. For example, service model persistence module 310 can create one or more new objects when the service model persistence module 310 determines at least some of the received information is not represented by objects stored in the CAS 304. Alternatively, the service model persistence module 310 can use existing objects, layers, checkpoints, timelines, or combinations thereof to model the deployed business service.

In some implementations, the application module 314 can be configured to improve a discovery process associated with the computing system 100. For example, a discovery process can probe components of the computing system 100 and populate the CMDB 302 with CIs representing the components associated with the computing system 100. The application module 314 can be configured to communicate with the discovery process. For example, the application module 314 can indicate to the discovery process that the application module 314 is deploying a business service based on a service model. The application module 314 can indicate to the discovery process when a component associated with the business service is deployed. The application module 314 can indicate that the deployed component is of a certain type. The discovery process can more efficiently discover the deployed component by utilizing the component type. For example, the discovery process can be configured to utilize a plurality of discovery types. A discovery type can be associated with a particular component type. For example, a first discovery type can be associated with a server type and a second discovery type can be associated with an application type. The discovery process can be configured to identify a component type through trial and error (e.g., trying a first discovery type, then a second discovery type, etc. until the discovery process identifies an appropriate type associated with the component). By utilizing the component type received from the application module 314, the discovery process can utilize a discovery type associated with the component type (e.g., reduce or avoid trial and error). Additionally, the application module 314 can indicate that other components associated with the business service have not been fully deployed. The discovery process can be configured to delay discovery of the components not fully deployed until the application module 314 indicates a component has been deployed.

In some implementations, the application module 314 can perform a discovery process to identify CIs associated with the computing system 100. The discovery process can probe components associated with the computing system 100 to identify computers and other devices connected to the computing system 100. When the discovery process identifies a computer or other device associated with the computing system 100, the discovery process explores or probes the identified computer or other device's configuration, provision, current status, attributes, or other suitable information associated with the identified computer or other device. The application module 314 can update the CMDB 302 in response to identifying a computer or other device associated with the computing system 100. For example, the application module 314 can create a new CI record in the CMDB 302 when the identified computer or other device is not represented by a CI record in the CMDB 302. Alternatively, the application module 314 can update an existing CI record to reflect attributes associated with the identified computer or other device.

In some implementations, the application module 314 can perform a horizontal discovery process. A horizontal discovery process can include scanning internet protocol (IP) addresses associated with components associated with the computing system 100. The application module 314 can then log into a component associated with an IP address and gather hardware and software information associated with the component.

In some implementations, the application module 314 can perform a top-down discovery process. A top-down discovery process can include receiving an entry point instance. An entry point instance can be, for example, a URL the indicates how to access a business service. The application module 314 can access the entry point instance. For example, the application module 314 can use login credentials to log into a component associated with the entry point instance. The application module 314 can gather information about the entry point instance and a component associated with the entry point instance. For example, the application module 314 can access a configuration file associated with the component to identify a name of the entry point or component, an application or component type associated with the entry point instance or component, identify entry points instances to components that the entry point instance or its associated component communicates with, other suitable information, or combinations thereof. The application module 314 can update the CMDB 302 to include a CI or CIs that represent the information associated with the entry point instance or the component associated with the entry point instance. The application module 314 can then identify and access entry points or components used by the component associated with the entry point. The application module 314 can repeat the steps above and continue to discover information about successive layers of entry points and components until the application module 314 cannot identify additional entry points. The application module 314 can update the CMDB 302 to include CIs that represent information associated with the identified components associated with the entry point instance including relationships between the components associated with the entry point instance.

In some implementations, the application module 314 can explore or probe a configuration file associated with an identified computer or other device associated with the computing system 100. The configuration file can include authoritative information about the identified computer or other device including other computers or other devices the identified computer or other device communicates with. In some implementations, the application module 314 can be prevented from exploring or probing a configuration file associated with an identified computer or other device (e.g., the application module 314 can lack proper security permissions required to access the configuration file). The application module 314 can monitor communications traffic associated with the identified computing or other device in order to identify other computers or other devices associated with the identified computer or other device. Monitoring traffic associated with an identified computer or other device can be less authoritative than obtaining information about the identified computer or other device from a configuration file. The application module 314 can include an attribute associated with a CI in the CMDB 302 corresponding to the identified computer or other device that indicates the information about the CI was obtained from a less authoritative source.

A CI associated with the entry point instance can have a relationship with one or more CIs. For example, a CI associated with an entry point instance can represent a first component associated with the entry point instance. The first component can communicate with one or more other components associated with the entry point instance. Similarly, the one or more other components that communicate with the first component can communicate with one or more additional components. The application module 314 can be configured to continue identifying CIs associated with the entry point instance until the application module 314 identifies an end point associated with at least one CI, as described above.

In some implementations, the application module 314 can identify components that facilitate communications between CIs associated with the entry point instance. Components that facilitate communications between CIs associated with the entry point instance can include routers, switches, or suitable communications components, or combinations thereof. The application module 314 can update the CMDB 302, as described above, to include CIs that represent the components that facilitate communications between the CIs associated with the entry point instance.

Figure 7:
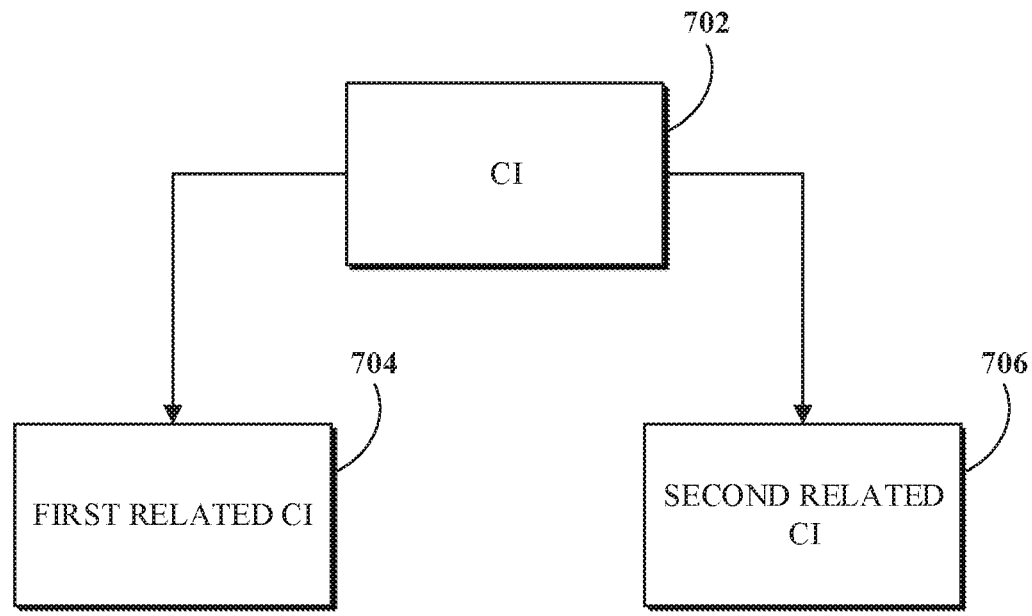
FIG. 7 is an illustration of example relationships between configuration items in a configuration management database.

In some implementations, an entry point instance can include information about how to access a business service. As described above, the application module 314 can perform a discovery process that can identify CIs associated with the entry point instance. In some implementations, the application module 314 can determine whether a CI identified as being associated with an entry point ("identified CI") is associated with a business service. As illustrated in FIG. 7, a CI can have relationships with multiple CIs. For example, a CI 702 can have a relationship with a first related CI 704 and a second related CI 706. It should be understood that a CI can have a relationship with more or fewer CIs that than those illustrated or described herein. The application module 314, as a result of performing a discovery process, can identify CIs associated with the entry point instance. However, not all CIs related to an entry point instance need be relevant to the business service.

In some implementations, the application module 314 can be configured to determine whether a CI identified as being associated with an entry point instance is associated with the business service based on relationships between the CI and other CIs associated with the entry point instance. In one example, the CI 702 can represent an Apache component, the first related CI 704 can represent a memcache component, and the second related CI 706 can represent a MySQL component. The service model persistence module 310 can determine that Apache (e.g., CI 702) and MySQL (e.g., the second related CI 706) are associated with the business service and that memcache (e.g., the first related CI 704) is not associated with the business service or, alternatively, not relevant to modeling the business service as a service model.

In some implementations, the application module 314 can determine that a CI is associated with the business service based on whether the CI communicates over a particular port to another CI. While only limited examples are described, it should be understood that the system 300 can determine whether a CI is associated with a business service utilizing other suitable techniques not described herein.

When the application module 314 determines that a CI is not associated with the business service, the application module 314 disregards the CI. Alternatively, when the application module 314 determines that a CI is associated with a business service, the application module 314 can perform a data abstraction on the CI. Performing a data abstraction can include identifying a CI type associated with the CI, identifying a component associated with the CI, identifying a name associated with the component, identifying relationships associated with the CI, identifying other suitable data associated with the CI, or combinations thereof.

In some implementations, the application module 314 can communicate an entry point instance, CIs associated with the entry point instance, abstracted data associated with the CIs associated with the entry point instance, CIs that facilitate communications between the CIs associated with the entry point instance, or combinations thereof to the service model management module 312. In some implementations, the application module 314 can communicate a location in the CMDB 302 associated with the entry point instance, CIs associated with the entry point instance, abstracted data associated with the CIs associated with the entry point instance, CIs that facilitate communications between the CIs associated with the entry point instance, or combinations thereof to the service model management module 312. In some implementations, and as described above, the service model management module 312 can generate a service model based on the entry point instance, the CIs associated with the entry point instance, abstracted data associated with the CIs associated with the entry point instance, CIs that facilitate communications between the CIs associated with the entry point instance, or combinations thereof.

In an implementation, the discovery process can include obtaining information relating to physical characteristics of a component and storing that information in a CI associated with that component. For example, a component may include a GPS or other sensor that may provide information about the physical location of a component or other information about the component and such information may be stored in the CI associated with that component.

While particular components and modules of the system 300 are described above as being configured to generate a service model, it should be understood that functions associated with particular components and modules can be performed by other components and modules. For example, the application module 314 can be configured to instruct the service model persistence module 310 to generate a service model, the application module 314 can be configured to determine whether to update or maintain a service model, the service model persistence module 310 can be configured to communicate with the CMDB 302, the service model management module 312 can be configured to perform a discovery process based on an entry point instance, the service model management module 312 can be configured to perform a data abstraction on identified CIs, other components or modules can be configured to perform functions of other components or modules, or combinations thereof.

FIG. 4 is a block diagram of an example data structure 400 usable in a content addressable store in an implementation of a service modeling system, such as service modeling system 300. Data structure 400 can include a service object type 402, element object type 404, relationship object type 406, and a cluster object type 408. An instance of service object type 402 can be configured to include references to the objects associated with a particular layer associated with a service model. For example, an instance of service object type 402 can primarily consist of hash values of other objects associated with a layer associated with a service model, such as instances of element object type 404, relationship object type 406, and cluster object type 408 associated with a layer. For example, a service object type 402 can include values associated with matching objects associated with a matching layer. The aggregation of the constituent components of a service by reference in an instance of service object type 402 can be advantageous when a subset of components of a service change. For example, in a case where an instance of service object type 402 includes references to one hundred components and one of those components change, the updated instance of service object type 402 includes one changed hash value and ninety-nine unchanged hash values. One new object is created (which generates the one changed hash value) for the updated component and the remaining ninety-nine objects are unchanged. By using this hierarchical object structure, the updated service can be represented with the addition of only two new objects to the content addressable store.

Instances of element object type 404 can be configured to represent individual CIs in the CMDB and can include a reference to the represented CIs. Instances of relationship object type 406 can be configured to represent relationships between CIs in the CMDB and can include the CIs that are related and the type of the relationship. The storage of relationships as an object separate from a CI (as compared to the CMDB, where a relationship between CIs can be stored as an attribute of a CI) can be advantageous to reduce the amount of data stored in the CAS. For example, while components of a business service may change and relationships between components of a business service, both may not necessarily change at the same time. By separating relationship and element data, updates to the service model can advantageously be stored more compactly when only one of a component or a relationship is updated. Instances of cluster object type 408 can be configured to refer to the element objects that make up a particular cluster. By separating out the representation of a cluster, changes to the composition of a cluster (which may frequently occur) can be more compactly represented.

In implementations of a service modeling system, additional object types, fewer object types, or modified object types can be utilized. For example, in an implementation, a package object type (not shown) can be provided that represents a template of a business service that can be deployed to a computer system. For example, in an implementation, a constraint object type (not shown) can be configured to represent a required number of CIs included in a cluster. For example, in an implementation, a path object type (not shown) can be configured to represent a path, or entry point, through which a business service can be accessed. For example, in an implementation, an impact object type (not shown) can be configured to include alerts or events associated with a business service. For example, in an implementation, an impact rule object type (not shown) can be configured to include impact rules for generating an impact value based on alerts or events associated with elements of a business service.

In an implementation, the object types referenced above can be implemented using an object oriented programming system, such as Java. For example, the object types referenced above can be implemented as classes of the object oriented programming system. Instances of the above referenced objects can be instantiated objects using the associated classes. In an implementation, the data (object) stored in the CAS is a serialization of individual objects and the associated hash of the stored object is an MD5 or SHA-1 cryptographic hash of the serialization. For example, in an implementation, the serialization can be generated using JavaScript Object Notation (JSON). For example, in an implementation, some or all of the described object types can extend a base object class that can provide common functionality for instances of the various object types. For example, a base object class can provide functionality such as creating objects, caching objects, reading from objects, serializing objects, measuring performance, indicating whether an object includes data, returning an identifier or hash associated with the object, or a combination thereof.

Figure 5:
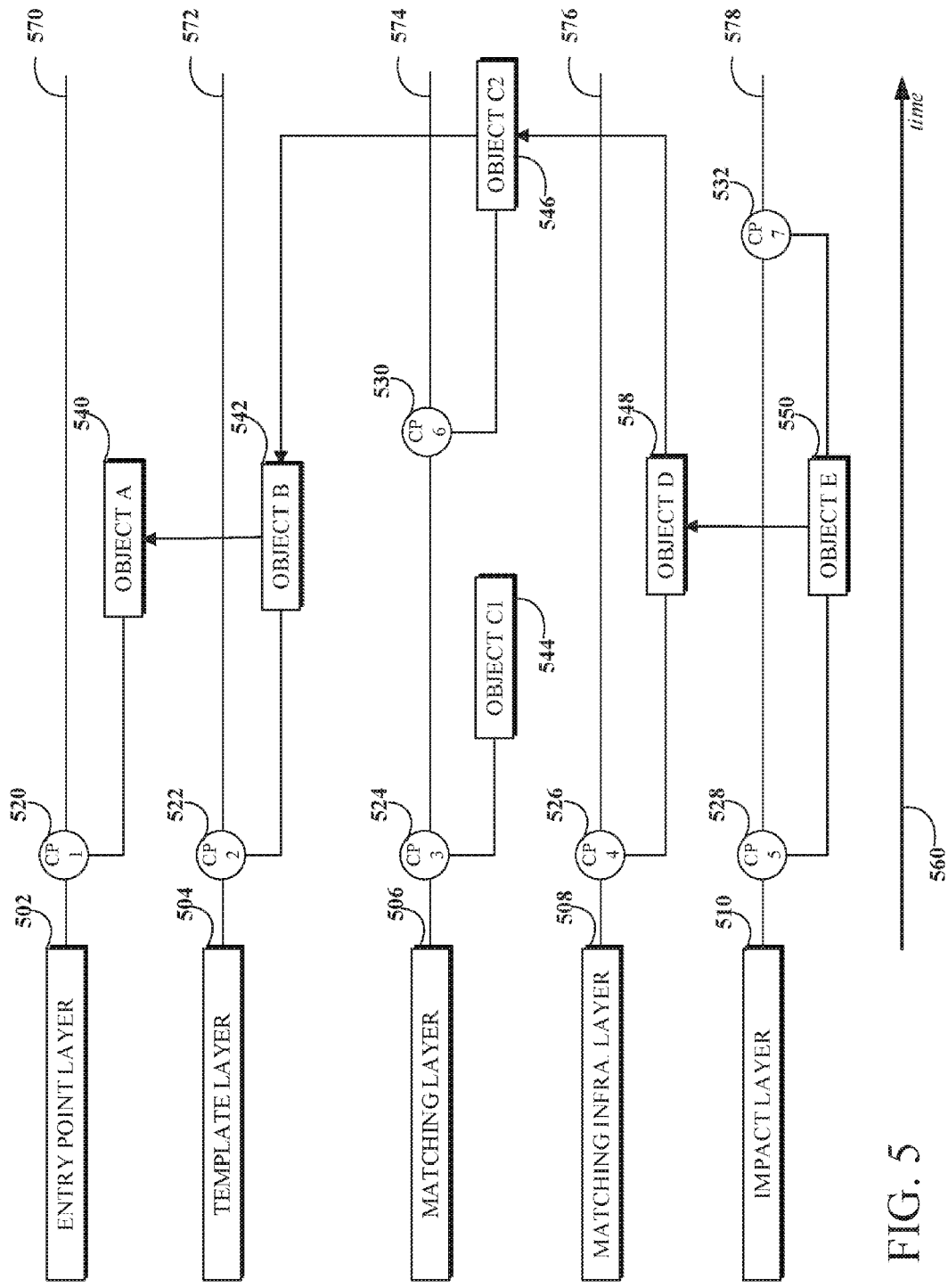
FIG. 5 is an illustration of example layers, checkpoints, objects, and timelines in an implementation of a service modeling system.

FIG. 5 is an illustration of example layers, checkpoints, objects, and timelines in an implementation of a service modeling system. The example layers include entry point layer 502, template layer 504, matching layer 506, matching infrastructure layer 508, and impact layer 510. In an implementation, entry point layer 502 and template layer 504 can be referenced as template type layers. In an implementation, matching layer 506, matching infrastructure layer 508, and impact layer 510 can be referenced as instance type layers. The layers 502-510 can have respective timelines 570-578 over a time axis 560. While example layers 502-510 are shown as each having only one timeline, in implementations, a layer may have multiple timelines at a first time and only one timeline at a second time. For example, timelines may be merged or deleted.

Timelines 570-578 may have associated checkpoints, such as checkpoints 520-532. For example, checkpoints 1-5 520-528 may be created upon creation of the service model. Checkpoints 6-7 530-532 may reflect updates to the service model and can be created later. Checkpoints 6-7 530-532 can explicitly refer to their timeline's respective prior checkpoints, checkpoint 3 524 and checkpoint 5 528, implicitly refer to the respective prior checkpoints (e.g., by association with timelines 574 and 578), or combinations thereof. While checkpoints are shown in each of layers 502-510, in implementations, some layers may not have checkpoints for some or all of time axis 560.

Checkpoints 520-532 may have associated objects which can store information about components of the business service relevant to the layers to which the respective objects are associated. For example, checkpoints 1-5 have an association respectively with objects A-E 540-550. This association can be made by storing a hash value associated with objects A-E 540-550 in checkpoints 1-5 520-528, such as previously described.

Some or all of the objects referenced by the checkpoints can have references to objects in other layers. For example, as shown, object B 542 references object A 540 and object E 550 references object D 548. The references between objects can, for example, include referencing the hash value of an object included within an object by another object. For example, object A 540 might be of a service object type 402 that references an instance of an element object type 404 that includes information about an entry point type. Object B 542 might be of a service object type 402 that references an instance of element object type 404 that includes information about a type of application software that is accessed using the entry point type referenced by object A 540.

The same object can be referred to by multiple checkpoints. For example, object E 550 is referred to by both checkpoint 5 528 and checkpoint 7 532. Checkpoint 7 532 may refer to the same object E 550 if, when the checkpoint is created, there is no change in the state of the information for the business service relating to that checkpoint's layer. For example, checkpoint 7 532 may have been created in response to the creation of checkpoint 6 530 (thus triggering a refresh of lower layers), may have been created after an intervening change to components associated with impact layer 510, or combinations thereof.

A later checkpoint on a timeline, such as timeline 574 can reference a different object, such as object C2 546 in response to a change in the state of components associated with its associated layer, such as layer 506. In such a case, lower layers can be invalidated and refreshed, which can result in a confirmation that the lower layer is unchanged (which may result in no checkpoint being created or a checkpoint being created with no change in state, depending on the implementation) or result in an indication of a change in the lower layer, which can result in a new checkpoint being created with a new object (not expressly shown).

Representations of layers 502-510, timelines 570-578, checkpoints 520-532, and objects 540-550 can be stored using a service modeling system, such as system 300. For example, layers 502-510, timelines 570-578, and checkpoints 520-532 can be stored in service model database 306 using service model persistence module 310 and objects 540-550 can be stored in CAS 304 using service model persistent module 310 using object types and techniques described with respect to data structure 400.

Figure 6:
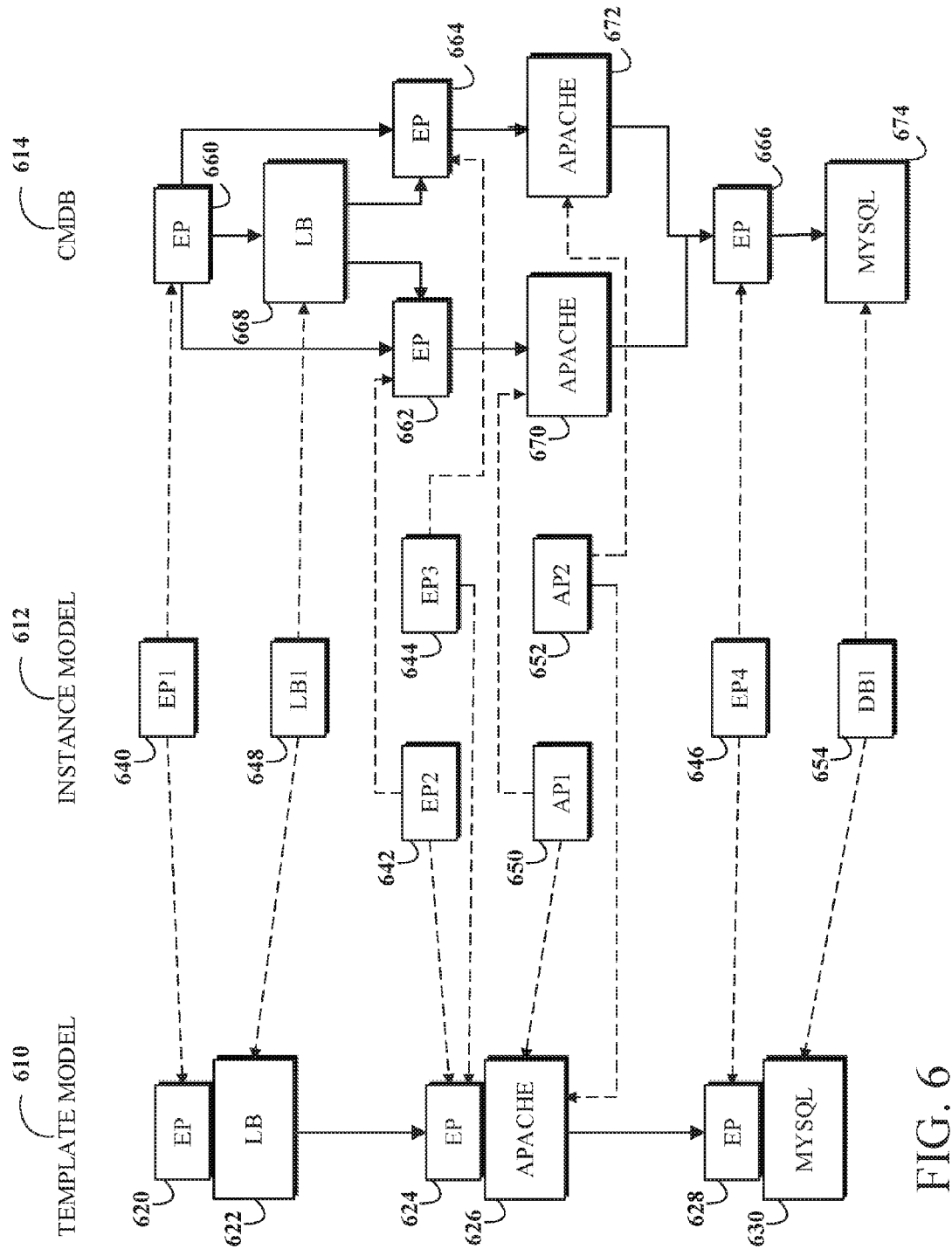
FIG. 6 is an illustration of example elements of a service model and a configuration management database in an implementation of a service modeling system.

FIG. 6 is an illustration of example elements of a service model and a configuration management database in an implementation of a service modeling system. Shown are elements of a template model 610, instance model 612, and CMDB 614. For example, template model 610 can be represented using template type layers, such as those previously described and instance model 612 can be represented using instance type layers, such as those previously described. Template model 610 includes entry point and template components and relationships that can be included in entry point and template layers of a service model, such as in service model system 300. Instance model 612 includes infrastructure and infrastructure matching components that can be included in infrastructure and infrastructure matching layers of a service model, such as in service model system 300. CMDB 614 includes components represented as CIs in a CMDB and relationships between CIs, which can be represented as attributes of CIs, such as in CMDB 302 of service model system 300.

Template model 610 can, for example, include an entry point 620 to load balancer 622, an entry point 624 to Apache web server 626, an entry point 628 to MySQL database server 630, and relationships between load balancer 622 and entry point 624 and Apache web server 626 and entry point 628. The components of template model 610 can refer to types of components that can make up a business service. For example, load balancer 622, Apache web server 626, and MySQL database server 630 of the template model refer to types of software used in implementations of a business service, not actual installations or instances of that software. In the context of service modeling system 300, entry points 620, 624, and 628 can be stored in an entry point layer using a checkpoint that references a service object that references respective element objects for entry points 620, 624, and 628. Further in the context of service modeling system 300, load balancer 622, Apache web server 626, and MySQL database server 630 can be stored in a template layer using a checkpoint that references a service object that references respective element objects for load balancer 622, Apache web server 626, and MySQL database server 630 and respective relationship objects referencing the relationships between load balancer 622 and entry point 624 and Apache web server 626 and entry point 628.

Instance model 612 can, for example, include entry point instances 1-4 640-646, load balancer instance 648, Apache web server instances 650, 652, and MySQL database server instance 654. The components of instance model 612 can be instances or installations of the types referenced in the template model 610 and can refer back to their respective types in the template model 610. In the context of service modeling system 300, entry point instances 1-4 640-646, Apache web server instances 650, 652, and MySQL database server instance 654 can be stored in a matching layer using a checkpoint that references a service object that references respective element objects for entry point instances 1-4 640-646, Apache web server instances 650, 652, and MySQL database server instance 654 and that references a cluster object referencing entry point instances 2, 3 642, 644 and Apache web server instances 650, 652. Further in the context of service modeling system 300, load balancer instance 648 can be stored in a matching infrastructure layer using a checkpoint that references a service object that references an element object load balancer instance 648.

CMDB 614 can, for example, include CIs for entry point instances 660-666, load balancer instance 668, apache web server instances 670, 672, and MySQL database instance 674. CMDB 614 can include relationships between the CIs including flow relationships between entry point 660 and entry points 662, 664, respective end point implementation relationships between entry point 660 and load balancer 668, entry point instances 662, 664 and apache web server instances 670, 672, and entry point instance 666 and MySQL database instance 674, and respective end point use relationships between load balancer 668 and entry point instances 662, 664 and between apache web servers 670, 672 and entry point instance 666. A flow relation can indicate that data flows from one component to another (e.g., in the case of entry points 660, 662, and 664, traffic flows through entry point instance 660 to entry point instances 662, 664 as directed by load balancer 668). An end point implementation relationship can indicate that a component handles traffic directed to a particular entry point. An end point use relationship can indicate that a component uses an entry point of another component. The displayed relationships are examples and additional, fewer, or different types of relationships may be used in other implementations of CMDB 614.

Figure 9:
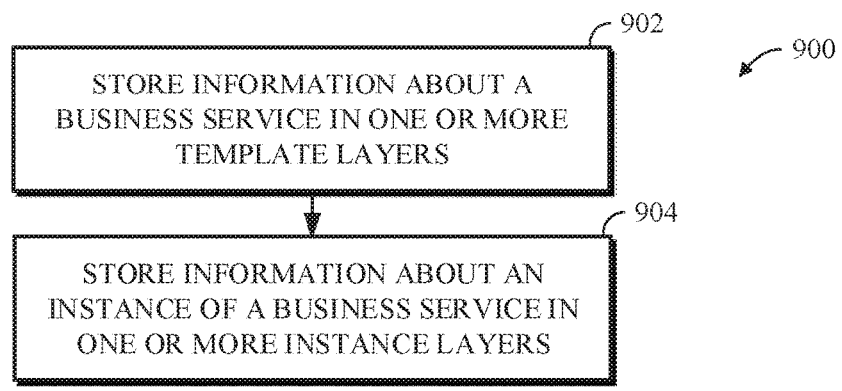
FIG. 9 is a flow chart of an example technique for using an implementation of a service modeling system.

FIG. 9 is a flow chart of an example technique 900 for using an implementation of a service modeling system, such as the service modeling system 300 of FIG. 3. The steps, or operations, of the technique 900 or any other method, process, or algorithm described in connection with the implementations disclosed herein can be implemented directly in hardware, firmware, software executed by hardware, circuitry, or a combination thereof. Technique 900 includes operations 902 and 904. Operation 902 includes storing information about a business service in one or more template type layers of a service model. Operation 904 includes storing information about an instance of a business service in one or more instance type layers of a service model. Technique 900 can be implemented, for example, using an implementation of a service modeling system, such as service modeling system 300. In some implementations, technique 900 can be implemented, for example, using the techniques described later with respect to FIG. 10B and can be used, for example, by the techniques described later with respect to FIGS. 10A and 10C.

For example, operation 902 can include creating one or more checkpoints on one or more layers of a service model including storing one or more objects including information about the business service in a content addressable store and linking the one or more objects to the created one or more checkpoints. The template type layers can include, for example, an entry point layer, a template layer, or other layers of information that may relate to the design, expected state, or templating of a business service.

For example, operation 904 can include creating one or more checkpoints on one or more layers of a service model including storing one or more objects including information about one or more instances of the business service (e.g., for which information was stored in operation 902) in a content addressable store and linking the one or more objects to the created one or more checkpoints. The instance type layers can include, for example, a matching layer, a matching infrastructure layer, an impact layer, or other layers of information that may relate to the implementation, installation, instances, or use of a business service.

Figure 10A:
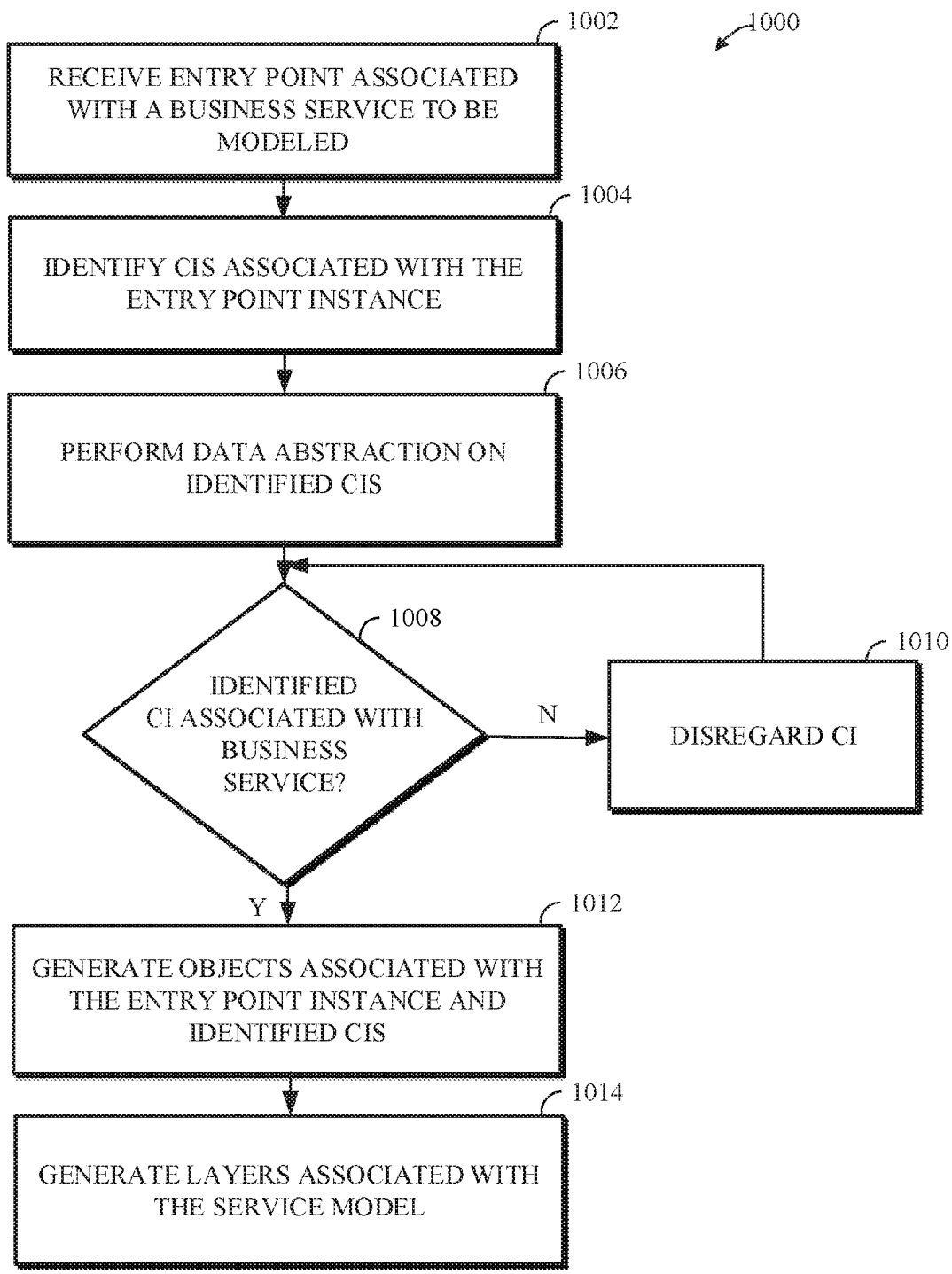
FIGS. 10A and 10B are flow charts of an example technique for generating a service model.
Figure 10B:
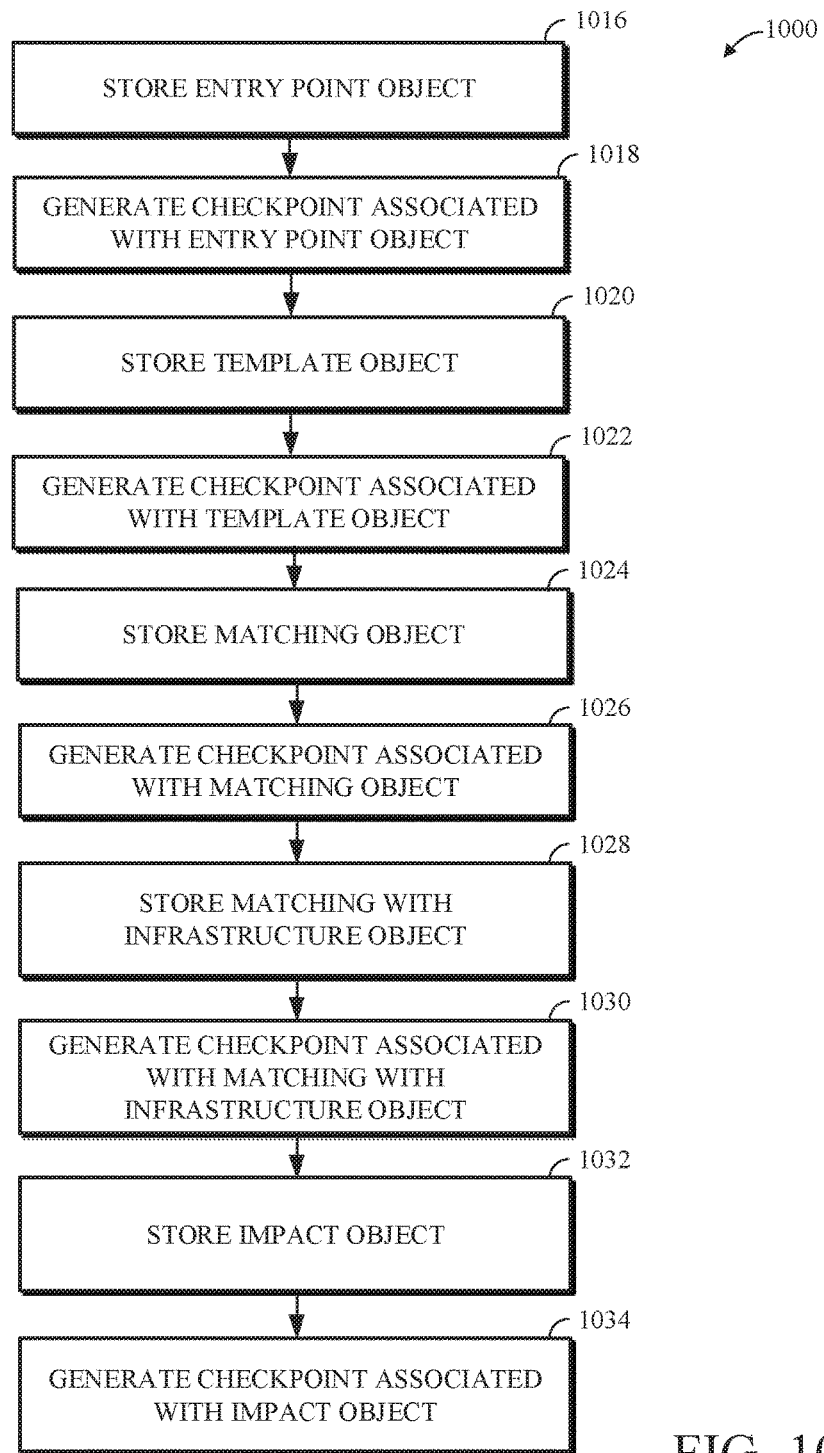
Figure 10C:
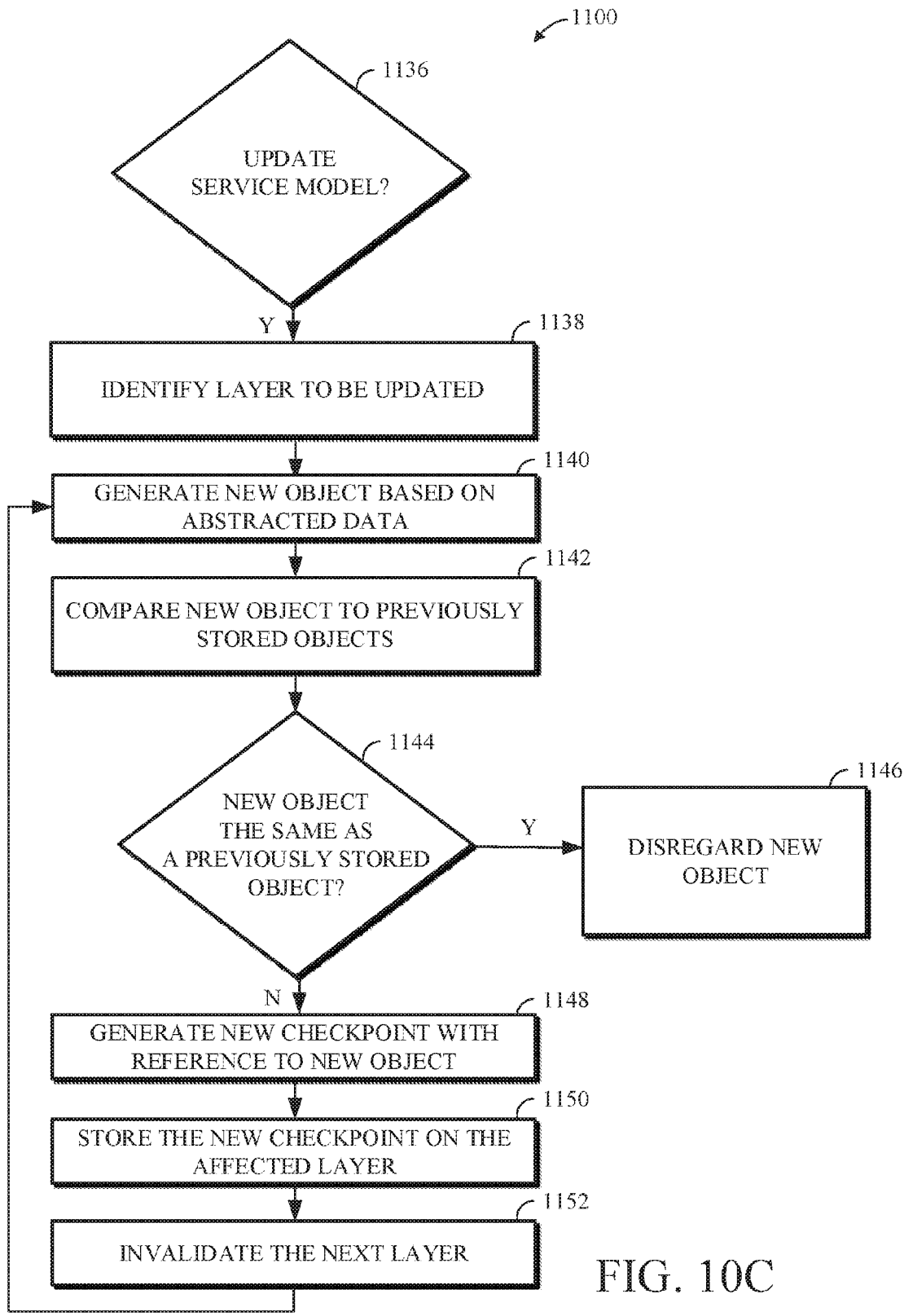
FIG. 10C is a flow chart of an example technique for updating a service model.

FIGS. 10A-10b are flowcharts illustrating a technique 1000 for modeling a business service based on components associated with an electronic computing and communications system, such as the system 100 of FIG. 1 including a service modeling system, such as the service modeling system 300 of FIG. 3. FIG. 10C is a flowchart illustrating a technique 1100 for updating a business model. In some implementations, the techniques 1000 and 1100 can be executed using computing devices, such as the systems, modules, and devices described with respect to FIGS. 1, 2, and 3. In some implementations, the techniques 1000 and 1100 can be performed, for example, by executing a machine-readable program or other computer-executable instructions, such as instructions or programs described according to JavaScript, C, or other such instructions. The steps, or operations, of the techniques 1000 and 1100 or any other method, process, or algorithm described in connection with the implementations disclosed herein can be implemented directly in hardware, firmware, software executed by hardware, circuitry, or a combination thereof.

At 1002, the technique 1000 can receive an entry point associated with a business service to be modeled. For example, the application module 314 can receive an entry point associated with a business service to be modeled. At 1004, the technique 1000 can identify CIs associated with the entry point and CIs that facilitate communications between the identified CIs. For example, as described above, the application module 314 can perform a top-down discovery process to identify CIs associated with the entry point. At 1006, the technique 1000 can perform a data abstraction on the identified CIs. For example, the service model management module 312 can perform a data abstraction on the identified CIs. At 1008, the technique 1000 can determine whether an identified CI is associated with the business service. For example, service model management module 312 can determine whether an identified CI is associated with the business service based on the abstracted data associated with the identified CI. If the identified CI is not associated with the business service, the technique 1000, at 1010, disregards the identified CI. The technique 1000 continues at 1008. If the identified CI is associated with the business service, the technique 1000 continues at 1012.

At 1012, the technique 1000 generates objects associated with the entry point and the identified CIs. For example, service model persistence module 310 can generate object associated with the entry point and one or more objects associated with the identified CIs. At 1014, the technique 1000 generates layers associated with the service model. For example, the layers module 320 can generate one or more template type layers that include an entry point layer and a template layer and one or more instance type layers that include a matching layer, a matching infrastructure layer, and an impact layer.

At 1016, the technique 1000 stores an entry point object in a content addressable store. For example, the service model persistence module 310 can store the entry point object (e.g., a service object that references an element object that includes information about an entry point) in the CAS 304. At 1018, the technique 1000 can generate a checkpoint associated with the entry point object. For example, t the checkpoints module 322 can generate a checkpoint that includes a timestamp and a reference to the entry point object. The checkpoints module 322 can store the checkpoint on the entry point layer. At 1020, the technique 1000 stores a template element object in the content addressable store. For example, the service model persistence module 310 can store the template object in CAS 304. At 1022, the technique 1000 can generate a checkpoint associated with the template object. For example, the checkpoints module 322 can generate a checkpoint that includes a timestamp and a reference to the template object. The checkpoint module 322 can store the checkpoint on the template layer.

At 1024, the technique 1000 stores a matching object in the content addressable store. For example, as described above, the service model persistence module 310 can store the matching object in the CAS 304. At 1026, the technique 1000 can generate a checkpoint associated with the matching object. For example, the service model persistence module 310 can generate a checkpoint that includes a timestamp and a reference to the matching object. The checkpoint module 322 can store the checkpoint on the matching layer. At 1028, the technique 1000 stores a matching infrastructure object in the content addressable store. For example, service model persistence module 310 can store the matching infrastructure element object in the CAS 304. At 1030, the technique 1000 can generate a checkpoint associated with the matching infrastructure object. For example, the checkpoint module 322 can generate a checkpoint that includes a timestamp and a reference to the matching infrastructure object. The checkpoint module 322 can store the checkpoint on the matching infrastructure layer. At 1032, the technique 1000 stores an impact object in the content addressable store. For example, service model persistence module 310 can store the impact object in the CAS 304. At 1034, the technique 1000 can generate a checkpoint associated with the impact object. For example, the checkpoint module 322 can generate a checkpoint that includes a timestamp and a reference to the impact object.

At 1136, the technique 1100 can determine whether to update a service model. For example, the system 300 can determine to update a service model in response to a change to a CI associated with the business service, in response to at least one layer becoming stale, or other suitable reasons for updating the service model. If the system 300 determines not to update the service model, the technique 1100 ends. If the system 300 determines to update the service model, the technique 1100 continues at 1138. At 1138, the technique 1100 identifies a layer associated with the service module to be updated. For example, layers module 320 can identify which of the entry point layer, template layer, matching layer, matching infrastructure layer, or impact layer is affected by a change to a CI associated with the business service or which layer has become stale. At 1140, the technique 1100 generates a new service object based on abstracted data. For example, the service model persistence module 310 can generate a new service object associated with the affected layer based on abstracted data associated with CIs identified as being associated with the business service (e.g., either as a result of a change or in response to the affected layer becoming stale). As described above, the application module 314 can perform a top-down discovery process to identify CIs. Alternatively, the service model management module 312 can retrieve update CIs stored in the CMDB 302 (as a result of the application module 314 performing the discovery process).

At 1142, the technique 1100 compares the new service object to service objects stored in a content addressable store. For example, service model persistence module 310 can compare the new service object generated as a result of a layer being affected to service objects associated with the affected layer stored in the CAS 304. At 1144, the technique 1100 determines whether the new service object is the same as a previously stored service object. For example, service model persistence module 310 can determine whether a hash value associated with the new service object is the same as a hash value associated with a service object associated with the affected layer and stored in the CAS 304. If the hash value associated with the new service object is the same as a hash value associated with a service object associated with the affected layer and stored in the CAS 304, the technique 1100 continues at 1146. If the hash value associated with the new service object is not the same as the hash value associated with one of the service objects associated with the affected layer and stored in the CAS 304, the technique 1100 continues at 1148.

At 1146, the technique 1100 disregards the new service object. For example, upon a determination that the hash value associated with new service object is the same as a hash value associated with a service object associated with the affected layer and stored in the CAS 304, the checkpoint module 322 can disregard the new service object. The checkpoint module 322 does not invalidate the next layer based on the determination that the hash value associated with the new service object is the same as a hash value associated with a service object associated with the affected layer and stored in the CAS 304.

In an alternative implementation of 1146, the checkpoint module 322 can generate a new checkpoint with a timestamp associated with a point in time that the checkpoint was generated and a reference to the service object associated with the affected layer and stored in the CAS 304. The checkpoint module 322 can store the new checkpoint on the affected layer. For example, the new service object associated with a matching layer have an associated hash value that already exists (e.g., is already stored) in the CAS 304 (e.g., service object associated with the matching layer already stored in the CAS 304 includes all of the objects associated with the new service object). The checkpoint module 322 can generate a new checkpoint with a timestamp associated with the point in time the new checkpoint was generated and with a reference to the service object already stored in the CAS 304. The checkpoint module 322 can store the new checkpoint on the matching layer. By generating a new checkpoint with a timestamp and a reference to a service object already stored in the CAS 304, the information stored on the matching layer (e.g., the new checkpoint) can provide an indication of what components were associated with the matching layer at the point in time the new checkpoint was generated. The checkpoint module 322 does not invalidate the next layer based on the determination that the hash value associated with the new service object is the same as a hash value associated with a service object associated with the affected layer.

At 1148, the technique 1100 generates a new checkpoint with a reference to the new service object. For example, as described above, the checkpoint module 322 can generate a new checkpoint having a timestamp associated with a point in time that the checkpoint was generated and a reference to the new service object. At 1150, the technique 1100 stores the new checkpoint on the affected layer. For example, the checkpoint module 322 can store the new checkpoint on the affected layer. At 1152, the technique 1100 invalidates the next layer. For example, the service model persistence module 310 can invalidate the layer below the affected layer. The service model persistence module 310 can generate a new service object associated with a layer below the affected layer. The technique 1100 continues at 1140.

Although the techniques 1000 and 1100 are shown as a series of operations for clarity, implementations of the techniques 1000, 1100, or any other technique, process, or algorithm described in connection with the implementations disclosed herein can be performed in various orders or concurrently. Additionally, operations in accordance with this disclosure can be performed with other operations not presented and described herein. Furthermore, one or more aspects of the systems and techniques described herein can be omitted.

All or a portion of the aspects of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can contain specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array, such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical".

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," and variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each reference were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A system for storing information about a business service in a content addressable store, the system comprising:

a server device including a processor, a memory, and a network interface, the memory including instructions executable by the processor to:
    identify configuration items stored in a configuration management database associated with the business service based on an entry point instance associated with the business service;
    generate a first object associated with the entry point instance;
    generate a second object including an association with an identified configuration item;
    generate a third object including an entry point representative of the entry point instance;
    generate a fourth object including a template representative of the identified configuration item;
    store the first, second, third, and fourth objects in the content addressable store;
    generate first, second, third, and fourth checkpoints having respective timestamps and respective references to respective ones of the first, second, third, and fourth objects;
    store the first and second checkpoints on an at least one instance type layer;
    store the third and fourth checkpoints on at least one template type layer;
    generate a dependency between the third checkpoint and the first checkpoint; and
    generate a dependency between the fourth checkpoint and the second checkpoint.

2. The system of claim 1, wherein the instructions to store the first, second, third, and fourth objects include instructions to:
    generate respective hash values for respective ones of the first, second, third, and fourth objects;
    store the objects of the first, second, third, and fourth objects not having a respective hash value already stored in the content addressable store.

3. The system of claim 1, wherein the configuration items are identified based on a top-down discovery process.

4. The system of claim 1, wherein the instructions include instructions executable by the processor to delete a plurality of historical checkpoints from the instance type layer and the template type layer.

5. The system of claim 4, wherein the instructions include instructions executable by the processor to perform a garbage collection process to remove objects from the content addressable store not referenced by checkpoints associated with the instance type layers or the template type layers.

6. The system of claim 1, wherein the instructions include instructions executable by the processor to:
    generate a snapshot of the business service at a point in time based on respective timestamps of checkpoints associated with the instance type layers or the template type layers.

7. The system of claim 1, wherein the instructions to generate a fourth object including a template representative of the identified configuration item includes identifying a configuration item type of the identified configuration item and including the identified configuration item type in the fourth object.

8. The system of claim 1, wherein the instructions include instructions executable by the processor to deploy an instance of a business service based on information associated with the at least one template type layer.

9. A method for storing information about a business service in a content addressable store, the method comprising:
    identifying configuration items stored in a configuration management database associated with the business service based on an entry point instance associated with the business service;
    generating a first object associated with the entry point instance;
    generating a second object including an association with an identified configuration item;
    generating a third object including an entry point representative of the entry point instance;
    generating a fourth object including a template representative of the identified configuration item;
    storing the first, second, third, and fourth objects in the content addressable store;
    generating first, second, third, and fourth checkpoints having respective timestamps and respective references to respective ones of the first, second, third, and fourth objects;
    storing the first and second checkpoints on an at least one instance type layer;
    storing the third and fourth checkpoints on at least one template type layer,
    generating a dependency between the third checkpoint and the first checkpoint; and
    generating a dependency between the fourth checkpoint and the second checkpoint.

10. The method of claim 9, wherein storing the first, second, third, and fourth objects include:
    generating respective hash values for respective ones of the first, second, third, and fourth objects;
    storing the objects of the first, second, third, and fourth objects not having a respective hash value already stored in the content addressable store.

11. The method of claim 9, wherein the configuration items are identified based on a top-down discovery process.

12. The method of claim 9, further comprising:
    deleting a plurality of historical checkpoints from the instance type layer and the template type layer.

13. The method of claim 12, further comprising:
    performing a garbage collection process to remove objects from the content addressable store not referenced by checkpoints associated with the instance type layers or the template type layers.

14. The method of claim 9, further comprising:
    generating a snapshot of the business service at a point in time based on respective timestamps of checkpoints associated with the instance type layers or the template type layers.

15. The method of claim 9, wherein generating a fourth object including a template representative of the identified configuration item comprises:
    identifying a configuration item type of the identified configuration item and including the identified configuration item type in the fourth object.

16. The method of claim 9, further comprising:
    deploying an instance of a business service based on information associated with the at least one template type layer.

17. A non-transitory computer-readable storage medium, comprising executable instructions that, when executed by a processor, facilitate performance of operations, comprising:
    identifying configuration items stored in a configuration management database associated with the business service based on an entry point instance associated with the business service;
    generating a first object associated with the entry point instance;

generating a second object including an association with an identified configuration item;

generating a third object including an entry point representative of the entry point instance;

generating a fourth object including a template representative of the identified configuration item;

storing the first, second, third, and fourth objects in the content addressable store;

generating first, second, third, and fourth checkpoints having respective timestamps and respective references to respective ones of the first, second, third, and fourth objects;

storing the first and second checkpoints on an at least one instance type layer;

storing the third and fourth checkpoints on at least one template type layer, generating a dependency between the third checkpoint and the first checkpoint; and generating a dependency between the fourth checkpoint and the second checkpoint.

18. The non-transitory computer-readable storage medium of claim 17, wherein storing the first, second, third, and fourth objects include:
generating respective hash values for respective ones of the first, second, third, and fourth objects;
storing the objects of the first, second, third, and fourth objects not having a respective hash value already stored in the content addressable store.

19. The non-transitory computer-readable storage medium of claim 17, further comprising:
generating a snapshot of the business service at a point in time based on respective timestamps of checkpoints associated with the instance type layers or the template type layers.

20. The non-transitory computer-readable storage medium of claim 17, wherein generating a fourth object including a template representative of the identified configuration item comprises:
identifying a configuration item type of the identified configuration item and including the identified configuration item type in the fourth object.

* * * * *